US006238708B1

(12) United States Patent
Hayek et al.

(10) Patent No.: US 6,238,708 B1
(45) Date of Patent: *May 29, 2001

(54) COMPOSITION AND PROCESS FOR CONTROLLING GLUCOSE METABOLISM IN COMPANION ANIMALS BY DIETARY STARCH

(75) Inventors: Michael Griffin Hayek, Dayton; Gregory Dean Sunvold, Eaton; Stefan Patrick Massimino, Dayton, all of OH (US)

(73) Assignee: The Iams Company, Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/507,066

(22) Filed: Feb. 18, 2000

Related U.S. Application Data
(60) Provisional application No. 60/121,087, filed on Feb. 23, 1999.

(51) Int. Cl.⁷ .................................................. A23K 1/18
(52) U.S. Cl. ............................ 426/2; 426/623; 426/635; 426/805
(58) Field of Search ............................ 426/2, 623, 805, 426/635

(56) References Cited

U.S. PATENT DOCUMENTS

| 5,087,623 | * | 2/1992 | Boynton et al. ............... 514/188 |
| 5,605,893 | * | 2/1997 | Kaufman ....................... 514/60 |
| 5,654,028 |   | 8/1997 | Christensen et al. ........... 426/574 |
| 5,846,581 |   | 12/1998 | Catron ........................ 426/74 |
| 5,932,258 |   | 8/1999 | Sunvold ....................... 426/2 |

FOREIGN PATENT DOCUMENTS 1135850A   11/1996   (CN).

OTHER PUBLICATIONS

Sunvold, G. Et Al., "Effect of Fermentable Fiber Consumption by the Dog on Nitrogen Balance and Fecal Microbia Nitrogen Excretion", FASEB Journal, US, Fed. of American Soc. For Experimental Biology, , Bethesda, MD., vol. 10, Jan. 1, 1996, pg. A.

Murray, S.M. Et Al., "Cereal Flour Incorporation Into Premium Diets Fed to Ileal Cannulated Dogs", FASEB Journal, vol. 11, 1997, p. a414 XP002141558.

Harrington–McGill, S., "Eat Right or Die Young", Dec. 12, 1996, p. 1–2, XP002141559.

Massimino, S.P. Et Al., "Glucose Tolerance in Old Dogs is Modified by Starch Source", FASEB Journal, vol. 13, Mar. 12, 1999, p. a375 XP002141557.

Bergman Et Al, "Quantitative estimation of insulin sensitivity", American Physiological Society, 1979, pp. E–667–77, vol. 236(6).

Bergman Et Al, "Physiologic Evaluation of Factors Controlling Glucose Tolerance in Man", J. Clin. Invest., 1981, pp. 1456–1467, vol. 68.

Milla Et Al, "Glycemic Response to Dietary Supplements in Cystic Fibrosis is Dependent on the Carbohydrate Content of the Formula", JPEN, 1996, pp. 182–186, vol. 20, No. 3.

Sunvold Et Al, "The Glycemic Response to Dietary Starch, Recent Advances in Canine Feline Nutrition", 1998 pp. 123–131.

* cited by examiner

*Primary Examiner*—Chhaya D. Sayala
(74) *Attorney, Agent, or Firm*—Killworth, Gottman, Hagan & Schaeff, L.L.P.

(57) ABSTRACT

A composition and process are provided for controlling postprandial glycemic and/or insulinemic response in companion animals such as dogs. The pet food composition includes a source of protein, a source of fat, and a source of carbohydrates from a grain source which excludes rice. Use of the preferred carbohydrate sources including a blend of corn and sorghum; a blend of corn, sorghum, and barley; a blend of corn, sorghum, and oats; and a blend of oats and barley tends to modulate the animal's glycemic and insulinemic responses after a meal. This effect is even more marked when the composition is fed to geriatric companion animals such as dogs.

53 Claims, 16 Drawing Sheets

| COL = CS/ Old /Lab | TOL = CRS / Old / Lab |
| CYL = CS / Young / Lab | TYL = CRS / Young / Lab |

* p-value indicates difference between diet of interest and RICE diet

\* p-value indicates difference between diet of interest and RICE diet

COMPOSITION AND PROCESS FOR CONTROLLING GLUCOSE METABOLISM IN COMPANION ANIMALS BY DIETARY STARCH

This application claims the benefit of U.S. Provisional Application No. 60/121,087 filed Feb. 23, 1999.

BACKGROUND OF THE INVENTION

The present invention relates to a composition and process for using it to alter and improve glucose metabolism in companion animals, particularly aging companion animals such as dogs.

Several different conditions are associated with impaired glucose metabolism in companion animals such as the dog and cat. These include diabetes (both insulin dependent type and non-insulin dependent maturity onset type), obesity, geriatrics, and gestation (pregnancy). Another associated metabolic disorder with obesity and diabetes is hyperinsulinemia. Hyperinsulinemia is the presence of insulin at abnormally high levels in the blood. Counteracting the effects of hyperinsulinemia by lowering insulin levels in the blood can help lessen the progression of obesity and diabetes.

Aging has been associated with a loss of glycemic control not only in humans, but in dogs as well. Older dogs have been reported to have attenuated glycemic responses compared to their younger counterparts. Reported causes for this glucose metabolism dysfunction in aging populations include: increased insulin resistance from receptor and post-receptor disturbances, diminished pancreatic islet B-cell sensitivity to glucose, and impaired peripheral glucose utilization. Age-associated increases in body fat deposition may also play a role. In both dogs and cats, glucose tolerance is impaired with obesity.

Several studies have examined the effect of age and glucose metabolism using the minimal model approach. Bergman's Minimal Model (Bergman et al., Am. J. Physiol, vol. 236(6), p. E-667-77(1979) and Bergman et al., J. Clin. Invest., vol. 68(6), p.1456–67 (1981)) quantifies both insulin sensitivity and pancreatic responsiveness in an intact organism. The minimal model approach uses computer modeling to analyze plasma glucose and insulin dynamics during an intravenous glucose tolerance test. Using this model, it has been suggested that aging is associated with a lower glucose disappearance rate, decreased insulin sensitivity to glucose, and a suppressed second phase B-cell response to glucose stimulation.

Starch has been suggested as the primary dietary component most responsible for the rise in blood glucose immediately following a meal (Milla et al., JPEN, vol. 20, p. 182–86 (1996). The term "glycemic index" was defined as a way to comparatively rank foods based on their glycemic response. The glycemic index and dietary content of carbohydrates have been used to explain approximately 90% of the reason for differences in glucose and insulin responses to a meal. However, such studies have focused on altering the amount of starch in a diet. But, in a recent study using young beagle dogs, the source of dietary starch was reported to influence the postprandial response to a meal (Sunvold et al., Recent Advances in Canine and Feline Nutrition, p. 123–34 (1998)). See also, Sunvold, U.S. Pat. No. 5,932,258.

Accordingly, there remains a need in the art for a dietary composition which can alter and improve a companion animal's glucose metabolism, particularly the glucose metabolism of an aging companion animal.

SUMMARY OF THE INVENTION

The present invention meets that need by providing a composition and process for using the composition to alter and improve glucose metabolism in companion animals such as dogs. In accordance with one aspect of the present invention, a pet food composition is provided and includes a source of protein, a source of fat, and a source of carbohydrates from a grain source which excludes rice. It has been found that a pet food composition which uses as the carbohydrate source a blend of corn and sorghum; a blend of corn, sorghum, and barley; a blend of corn, sorghum, and oats; or a blend of oats and barley, tends to modulate the animal's glycemic and insulinemic responses after a meal. This effect is even more marked when the composition is fed to geriatric companion animals such as dogs. By "geriatric dog" it is meant any dog seven years of age or older and under 90 lbs (40 kg) of body weight, or any dog five years of age or older and over 90 lbs (40 kg) of body weight (large or giant breed).

Where the source of carbohydrates is a blend of corn and sorghum, or a blend of oats and barley, it is preferred that these starch sources be present in the composition in a weight ratio of from between about 1:5 to about 5:1, more preferably from about 1:3 to about 3:1, and most preferably about 1:1. Where the source of carbohydrates is a blend of corn, sorghum and barley, or corn, sorghum and oats, it is preferred that these starch sources be present in the composition in a weight ratio of from between about 1:1:5 to about 1:5:1 to about 5:1:1, more preferably from about 1:1:3 to about 1:3:1 to about 3:1:1, and most preferably about 1:1:1, respectively.

Preferably, the composition comprises from about 20 to about 40% crude protein, from about 4 to about 30% fat, from about 2 to about 20% total dietary fiber, and a source of starch which excludes rice but includes a blend of other grain sources such as corn and sorghum; corn, sorghum, and barley; corn, sorghum, and oats; or oats and barley. Typically, the carbohydrate sources in the composition of the present invention will make up from about 35 to about 60 wt % of the composition.

The pet food composition may optionally include chromium tripicolinate and a water soluble, cellulose ether. Additionally, the pet food composition may further include from about 1 to about 11 weight percent of supplemental total dietary fiber of fermentable fibers which have an organic matter disappearance of 15 to 60 weight percent when fermented by fecal bacteria for a 24 hour period.

The invention also includes a process for controlling postprandial glycemic and insulinemic responses in a companion animal comprising the step of feeding the companion animal a pet food composition comprising a source of protein, a source of fat, and a source of carbohydrates which excludes rice. Preferably, the carbohydrate source includes a grain source such as a blend of corn and sorghum; a blend of corn, sorghum, and barley; a blend of corn, sorghum, and oats; or a blend of oats and barley.

Accordingly, it is a feature of the present invention to provide a composition and process of using it to improve glucose and/or insulin metabolism in companion animals, particularly aging companion animals by controlling the postprandial glycemic and/or insulinemic responses in those animals. This, and other features and advantages of the present invention, will become apparent from the following detailed description, the accompanying drawings, and the appended claims.

DETAILED DESCRIPTION OF THE PREFERRED EMBODIMENTS

Figure 1:
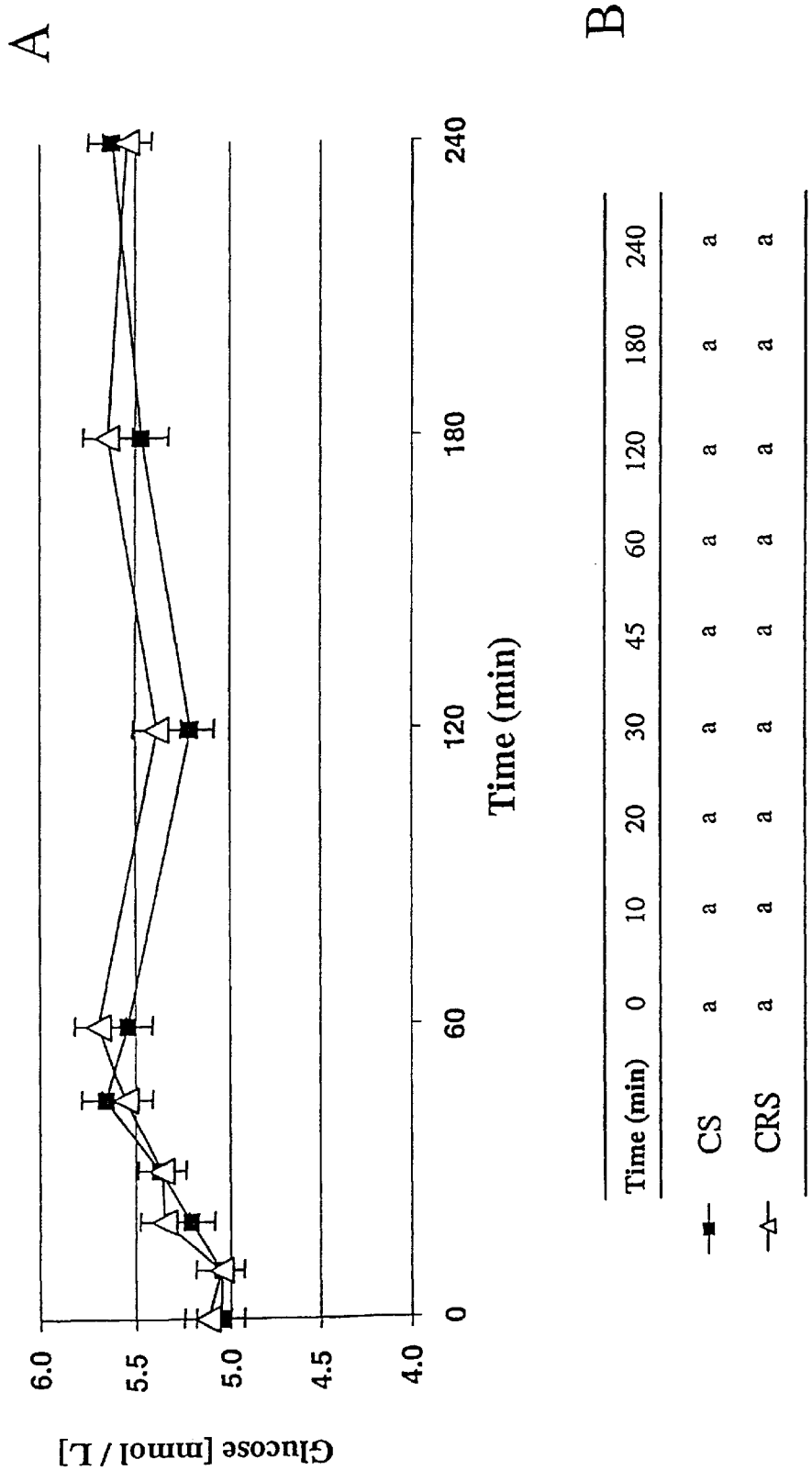
FIG. 1 is a graph illustrating the effect of diet on plasma glucose curve (A) and corresponding statistical differences (B) in dogs after a meal.

The present invention utilizes a pet food composition which excludes rice but includes a grain source which aids in modulating a companion animal's glycemic and/or insulinemic responses such as a blend of corn and sorghum; a blend of corn, sorghum and barley; a blend of corn, sorghum, and oats; or a blend of oats and barley. In a healthy, but aged (geriatric), companion animal, the presence of rice as a dietary starch source exacerbates the glycemic and insulinemic responses to a meal, independent of body composition, glucose clearance, or half-life. Healthy geriatric animals will especially benefit from being fed the composition of the present invention. For example, large breed geriatric dogs suffering from hyperinsulinemia will especially benefit from being fed the composition of the present invention.

The pet food composition can be any suitable pet food formula which also provides adequate nutrition for the animal. For example, a typical canine diet for use in the present invention may contain from about 20 to about 40% crude protein (and preferably about 25 to about 35%), from about 4 to about 30% fat (and preferably about 10 to about 18%), and from about 2 to about 20% total dietary fiber, along with the starch source, all percentages by weight. Typically, the carbohydrate sources in the composition of the present invention will make up from about 35 to about 60 wt %, and preferably from about 40 to about 55 wt %, of the composition. A preferred source of corn is ground corn meal.

The composition also optionally contains other ingredients which also have the effect of minimizing the postprandial glycemic and/or insulinemic response in an animal. The composition may include chromium tripicolinate in an amount of from between about 10 to about 500 micrograms of chromium per day. Chromium tripicolinate occurs in brewer's yeast, and the yeast may be added to the pet food composition. Alternatively, the chromium tripicolinate may be added to the composition in a substantially pure form.

The composition may also contain a water soluble cellulose ether such as, for example, carboxymethyl cellulose or hydroxypropylmethyl cellulose ether (HPMC). If carboxymethyl cellulose is used, it is preferably a high viscosity composition in the range of from about 5,000 to about 65,000 cps and is added to the composition in an amount of approximately 1% by weight. If HPMC is utilized, it is preferably also a high viscosity composition in the range of from about 10,000 to about 2,000,000 cps and is added to the composition in an amount of from about 1–2% by weight. A suitable grade of HPMC is available from The Dow Chemical Company under the designation METHOCEL™ K-100M. It has been found that such water soluble cellulose ethers have the effect of delaying the postprandial rise of glucose levels in the animal's blood.

The pet food composition of the present invention may also optionally contain a source of fermentable fibers which display certain organic matter disappearance percentages. The fermentable fibers which may be used have an organic matter disappearance (OMD) of from about 15 to 60 percent when fermented by fecal bacteria in vitro for a 24 hour period. That is, from about 15 to 60 percent of the total organic matter originally present is fermented and converted by the fecal bacteria. The organic matter disappearance of the fibers is preferably 20 to 50 percent, and most preferably is 30 to 40 percent.

Thus, in vitro OMD percentage may be calculated as follows:

{1-[(OM residue−OM blank)/OM initial]}×100, where OM residue is the organic matter recovered after 24 hours of fermentation, OM blank is the organic matter recovered in corresponding blank tubes (i.e., tubes containing medium and diluted feces, but no substrate), and OM initial is that organic matter placed into the tube prior to fermentation. Additional details of the procedure are found in Sunvold et al, J. Anim. Sci. 1995, vol. 73:1099–1109.

The fermentable fibers may be any fiber source which intestinal bacteria present in the animal can ferment to produce significant quantities of SCFAs. "Significant quantities" of SCFAs, for purposes of this invention, are amounts over 0.5 mmol of total SCFAs/gram of substrate in a 24 hour period. Preferred fibers include beet pulp, gum arabic (including gum talha), psyllium, rice bran, carob bean gum, citrus pulp, pectin, fructooligosaccharides and inulin, mannanoligosaccharides and mixtures of these fibers.

The fermentable fibers are used in the pet food composition in amounts from 1 to 11 weight percent of supplemental total dietary fiber, preferably from 2 to 9 weight percent, more preferably from 3 to 7 weight percent, and most preferably from 4 to 7 weight percent.

A definition of "supplemental total dietary fiber" first requires an explanation of "total dietary fiber". "Total dietary fiber" is defined as the residue of plant food which is resistant to hydrolysis by animal digestive enzymes. The main components of total dietary fiber are cellulose, hemicellulose, pectin, lignin and gums (as opposed to "crude fiber", which only contains some forms of cellulose and lignin). "Supplemental total dietary fiber" is that dietary fiber which is added to a food product above and beyond any dietary fiber naturally present in other components of the food product. Also, a "fiber source" is considered such when it consists predominantly of fiber.

In order that the invention may be more readily understood, reference is made to the following examples which are intended to illustrate the invention, but not limit the scope thereof.

EXAMPLE 1

Eighteen young (0.7±0.2 years) and old (9.6±0.2 years) Labrador Retrievers (LR) and Fox Terriers (FT) were equally divided by age and breed then randomly assigned to one of two nutritionally complete diets (n=18/diet) for 90 days. The first diet contained 18.2% (w/w) ground corn, 18.2% (w/w) brewers rice, and 18.2% (w/w) grain sorghum (CRS diet) as the starch sources; the second diet contained 28.5% (w/w) ground corn and 28.5% (w/w) grain sorghum (CS diet) as the starch sources. See Tables 1 and 2 below. Both diets were isoenergetic, providing approximately 19.3 and 19.4 kJ/g, CS and CRS diets, respectively, and did not differ in total starch content.

TABLE 1

Ingredient Composition of Diets

|  | CS[1] Diet (g/kg) | CRS[1] Diet (g/kg) |
|---|---|---|
| Ground corn | 285 | 182 |
| Grain sorghum | 285 | 182 |
| Brewers rice | 0 | 182 |
| Poultry by-product meal | 251 | 277 |
| Poultry fat | 61 | 60 |
| Beet pulp | 40 | 40 |
| Chicken digest | 20 | 20 |
| Dicalcium phosphate | 12 | 8 |
| Brewers dried yeast | 10 | 10 |
| Dried whole egg | 10 | 10 |
| Calcium carbonate | 8 | 8 |
| Monosodium phosphate | 4 | 5 |
| Potassium chloride | 3 | 5 |
| Mineral premix[2] | 3 | 3 |
| Vitamin premix[3] | 2 | 2 |
| Choline chloride | 2 | 2 |
| Sodium chloride | 2 | 1 |
| DL-Methionine | 2 | 2 |

[1]CS = corn/grain sorghum, CRS = corn/rice/grain sorghum.
[2]Mineral premix provided the following per kg diet: 41 mg manganese, 217 mg zinc, 168 mg iron, 47 mg copper, 4 mg iodine, 80 μg magnesium, 4.8 mg sulfur, 620 μg selenium TABLE 1-continued Ingredient Composition of Diets

|  | CS[1] Diet (g/kg) | CRS[1] Diet (g/kg) |
|---|---|---|

[3]Vitamin premix provided the following per kg diet: 25 KIU vitamin A, 124 IU vitamin E, 1561 IU vitamin D3, 14 mg thiamin, 59 mg riboflavin, 90 mg niacin, 32 mg d-pantothenic acid, 10 mg pyroxidine, 600 μg biotin, 1.9 mg folic acid, 2067 mg choline, 23 mg inositol, 0.31 IU vitamin $B_{12}$.

TABLE 2

Nutritional Composition of Diets[1]

|  | CS[2] Diet % | CRS[2] Diet % |
|---|---|---|
| Dietary starch | 43.1 | 43.2 |
| Protein | 25.5 | 27.0 |
| Fat | 12.8 | 13.2 |
| Ash | 6.5 | 6.5 |
| Moisture | 7.0 | 6.8 |
| Calcium | 1.3 | 1.3 |
| Phosphorus | 1.1 | 1.1 |
| Gross Energy (kJ/g) | 19.3 | 19.4 |

[1]All values except moisture are expressed on a dry matter basis.
[2]CS = corn/grain sorghum, CRS = corn/rice/grain sorghum.

After 60 days on the CRS diet (which was fed as the basal diet), all animals underwent a glycemic response (GR) test followed by a glucose tolerance test (GTT; described below). After a 90-day consumption period on the experimental diets, animals underwent the same tests including a whole body dual energy x-ray absorptiometry (DEXA) scan to determine body fat, lean body mass and mineral composition. Animals were weighed daily and feed intakes were recorded and adjusted to minimize weight fluctuations during the study. One animal was removed from the study for health reasons. The research protocol was approved by the Institutional Animal Care and Use Committee.

The GR test was conducted on all animals both before and after the 90-day feeding period. Animals were fasted for 24 hours prior to the test. On the morning of the test, animals were fed one half their daily meal allowance. All meals were consumed within 10 minutes of presentation. An indwelling catheter (14-gauge 14 cm in the LR, 22-gauge, 3.2 cm in the FT) was sutured in place using 3-0 Dexon (Butler, Columbus, Ohio) in either the left or right jugular vein and flushed with heparinized saline. Blood samples were collected for glucose and insulin analysis at −10, 0, 10, 20, 30, 45, 60, 120, 180 and 240 minutes. The −10 and 0 min time points were averaged to yield a single baseline time point. Data was plotted and analyzed as incremental area under the curve (IAUC) determined by the trapezoidal method. IAUC is defined as the area under the response curve, but above the baseline.

A GTT was also conducted one week after the GR. Animals were fasted 24 hours prior to the GTT. Prior to administration, a 14 gauge 14 cm indwelling catheter 5 was placed in either the left or right jugular vein in the LR and a smaller 22 gauge 3.2 cm catheter was used in the FT. Heparinized saline was flushed through the catheters which were sutured in place using 3-0 Dexon (Butler, Columbus, Ohio). Blood samples were collected for glucose and insulin analysis at −20, −10, 0, 2, 4, 6, 8, 10, 12, 14, 16, 19, 22, 25, 30, 40, 50, 60, 70, 80, 90, 100, 120, 140, 160, and 180 minutes. Glucose (50% solution; Butler, Columbus, Ohio) was infused at time 0 (0.3 g glucose/kg body weight) as described by Bergman et al.(1981) and Duysinx et al., Diabete Metab, vol. 20, p. 425–32 (1994). Insulin (Human Insulin Novolin R, Novo Nordisk, Denmark) was infused at 20 minutes. Blood samples for glucose and insulin analysis were collected in heparinized Vacutainer™ tubes (Becton Dickinson, Sunnyvale, Calif. and samples for hematological analysis were collected in SST Vacutainer™ tubes (Becton-Dickinson, Sunnyvale, Calif. Plasma for glucose and insulin determinations was obtained by centrifuging blood (1850× g) for 8 minutes at room temperature.

Glucose was analyzed immediately by glucose oxidase and a Cobas Mira Analyzer (Roche Diagnostics Systems, Somerville N.J.) and insulin was stored at −20° C. and sent to Indiana Veterinary Diagnostics Labs (Evansville, Ind.) where it was analyzed using a DPC insulin coated-tube RIA (Indiana Veterinary Diagnostics Labs, Evansville, Ind.). Data was plotted and analyzed by Bergman's Minimal Model program (Version 3.0, Los Angeles, Calif. to determine insulin sensitivity (Si), glucose effectiveness (Sg), the acute insulin response to glucose (AIRg) and glucose concentration at t=0 estimated by extrapolating the prediction of the glucose kinetics model to the moment of injection (thus cardiovascular mixing is not included; G(0)). The fractional turnover rate of glucose (k) and the half-life ($T^{1/2}$) of glucose were calculated by linear regression of log 10 of the glucose concentrations between 4 and 30 minutes.

Dual energy x-ray absorptiometry was performed following intravenous sedation with 7 mg/kg propofol (Rapinovet, Mallinckrodt Veterinary, Inc.) at a concentration of 10 mg/mi. The animals were maintained at an appropriate anesthetic plane via isoflurane and oxygen delivered by a Matrix anesthetic machine (Butler, Columbus, Ohio). If necessary, a supplemental dose of propofol at 3.3 mg/kg was given to facilitate induction of anesthesia. The animals were scanned in sternal recumbency with their front legs parallel to their sides and their back legs in a straight line with the rest of their body.

After the scans were completed, the animals were allowed to recover from anesthesia. Whole body composition scans were performed using a Hologic QDR 4500 X-ray Bone Densitometer (Waltham, Mass. Scans were analyzed using Hologic Software (Version 9.03, Waltham, Mass.

All statistical analyses were performed using the Statistical Analysis System (SAS) statistical package (version 6.12, SAS Institute, Cary, N.C.). All data generated for GTT and DEXA were analyzed using proc GLM, and significant differences were identified by one-way ANOVA. The model included diet, age and breed and all interaction effects. Differences within individual time points for the glucose and insulin curves were determined using least square means. Correlation coefficients between body composition and k and $T^{1/2}$ were analyzed using Pearson's correlation coefficient. All data are presented as means±SEM except correlation coefficients. Significant differences were identified when p<0.05.

RESULTS:

Individual animal weights did not vary throughout the study period (data not shown), by diet (19.5±0.9 kg and 20.8±0.9 kg, CS and CRS, respectively; p=0.31) or by age (20.3±0.9 kg and 20.1±0.9 kg, young and old animals, respectively; p=0.86). However, significant differences in weight did occur between breeds (31.9±0.9 kg and 8.5±0.9 kg, LR and FT, respectively; p<0.0001). When dietary intake was expressed as g/kg body weight, no significant differences were noted between diets (19.3±0.7 g/kg body weight and 20.2±0.7 g/kg body weight, CS and CRS, respectively; p=NS). As expected, age and breed both affected daily intake amounts (22.2±0.7 g/kg body weight and 17.3±0.7 g/kg body weight, young and old animals, respectively; p<0.001; 15.6±0.7 g/kg body weight and 23.9±0.7 g/kg body weight, LR and FT respectively; p<0.001).

Figure 2:
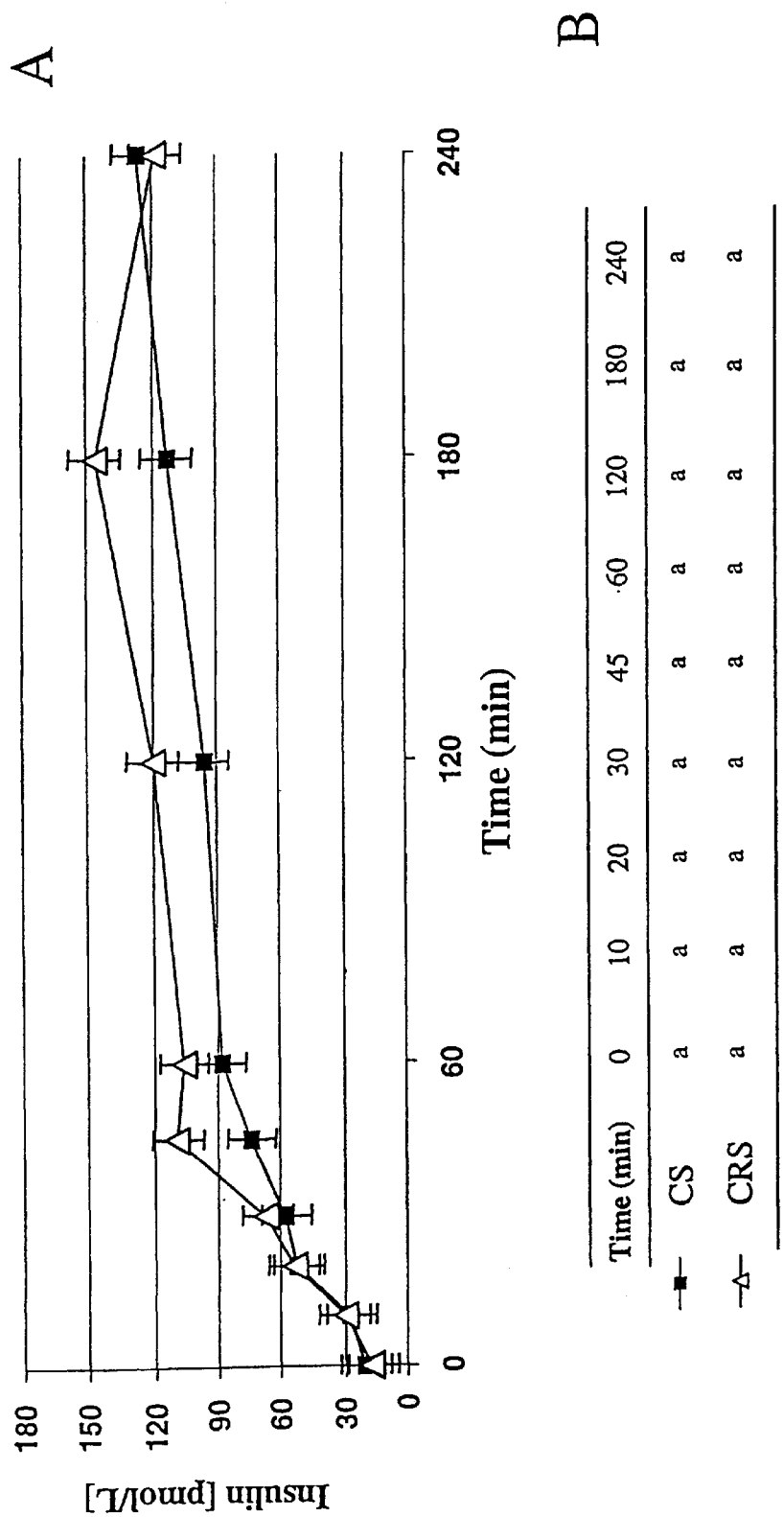
FIG. 2 is a graph of the effect of diet on plasma insulin curve (A) and corresponding statistical differences (B) in dogs after a meal.

Glycemic Response Test:

The effects of diet on the glucose (FIG. 1) and insulin (FIG. 2) responses were analyzed. No significant differences due to diet alone were seen for plasma glucose, and a weak trend was noted for the difference in insulin response (p=0.21) with the CRS diet eliciting a higher insulin response than the CS diet.

Figure 3:
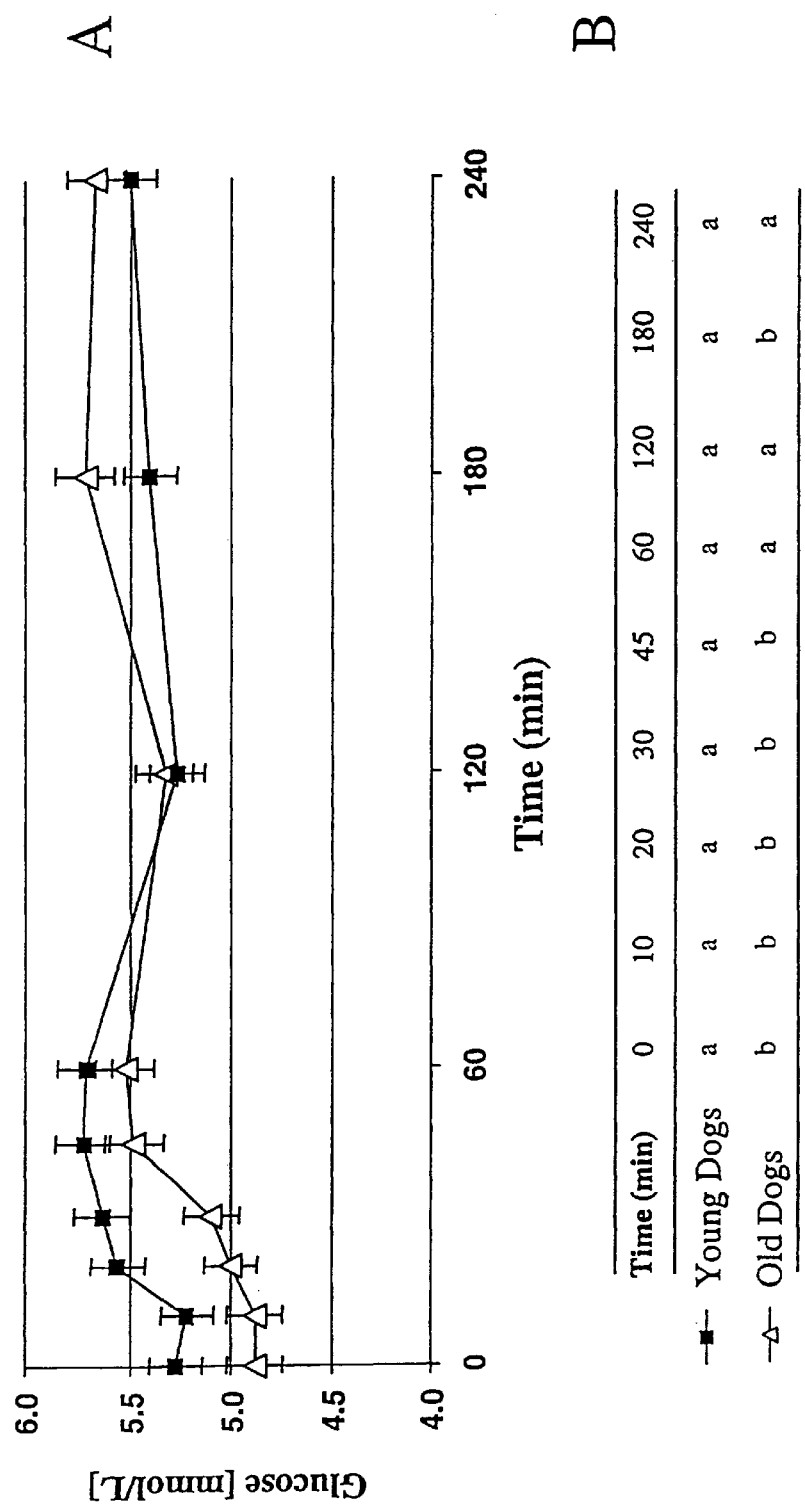
FIG. 3 is a graph of the effect of age on plasma glucose curve (A) and corresponding statistical differences (B) in dogs after a meal.
Figure 4:
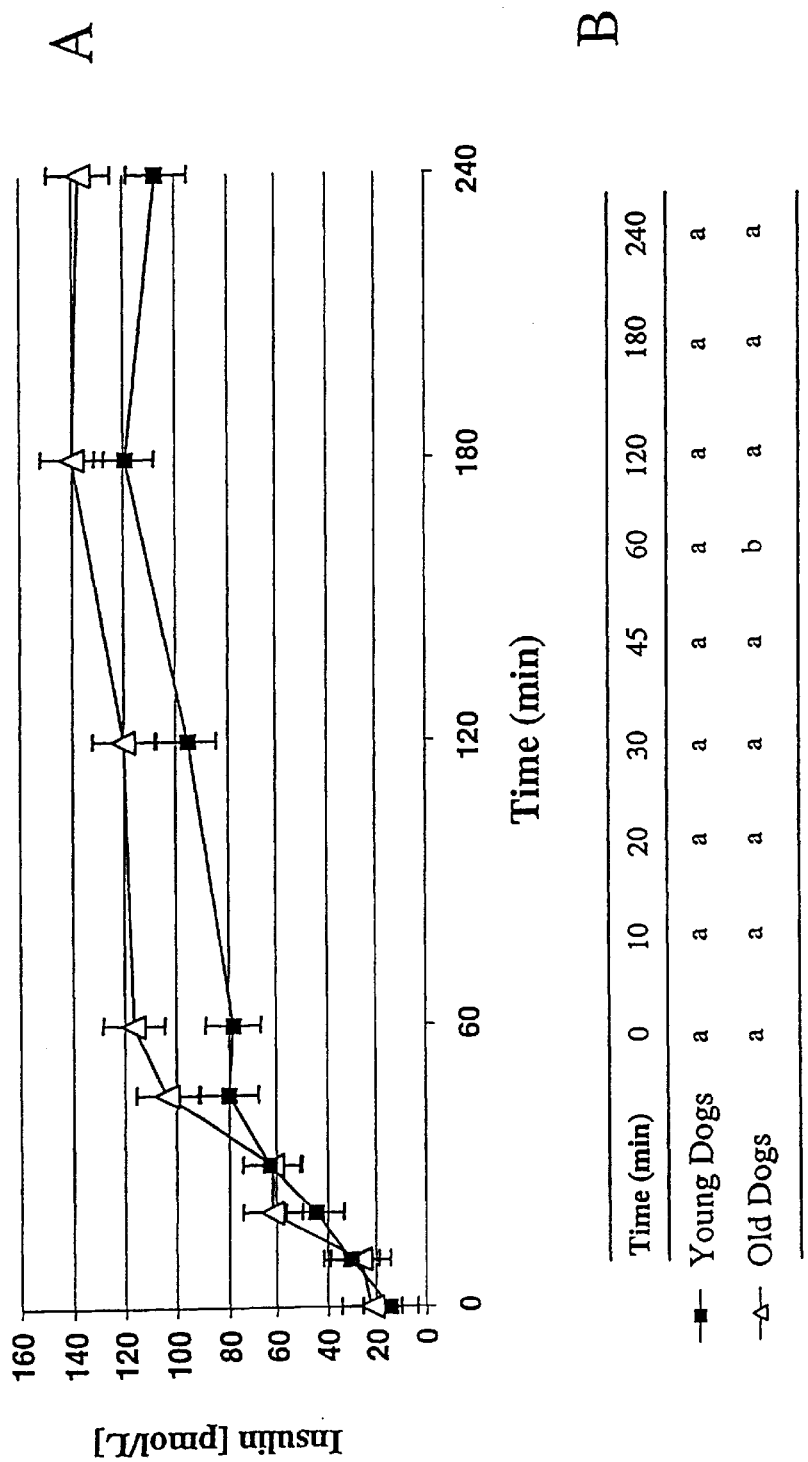
FIG. 4 is a graph of the effect of age on plasma insulin curve (A) and corresponding statistical differences (B) in dogs after a meal.
Figure 5:
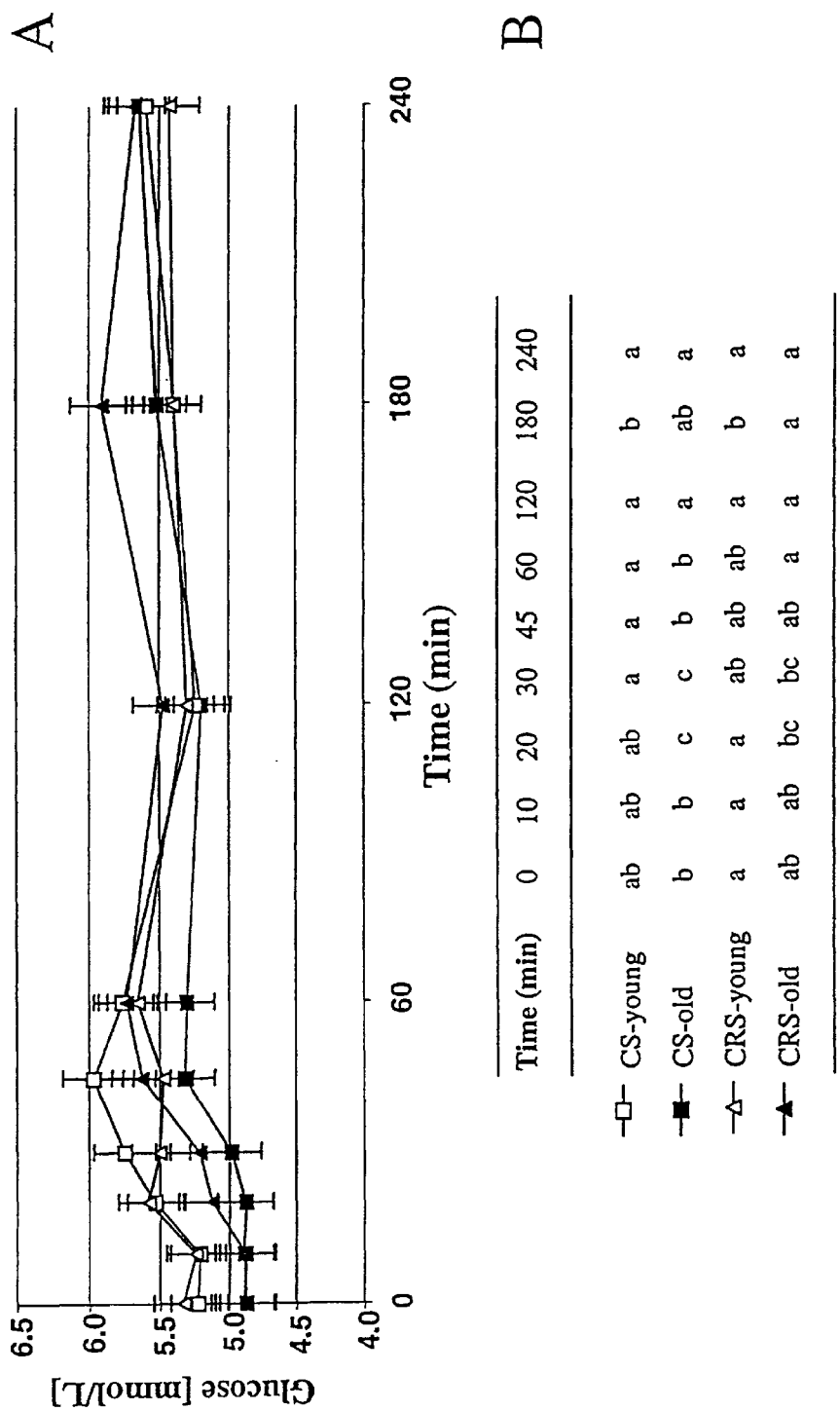
FIG. 5 is a graph of the age*diet interaction effect on plasma glucose curve (A) and corresponding statistical differences (B) in dogs after a meal.
Figure 6:
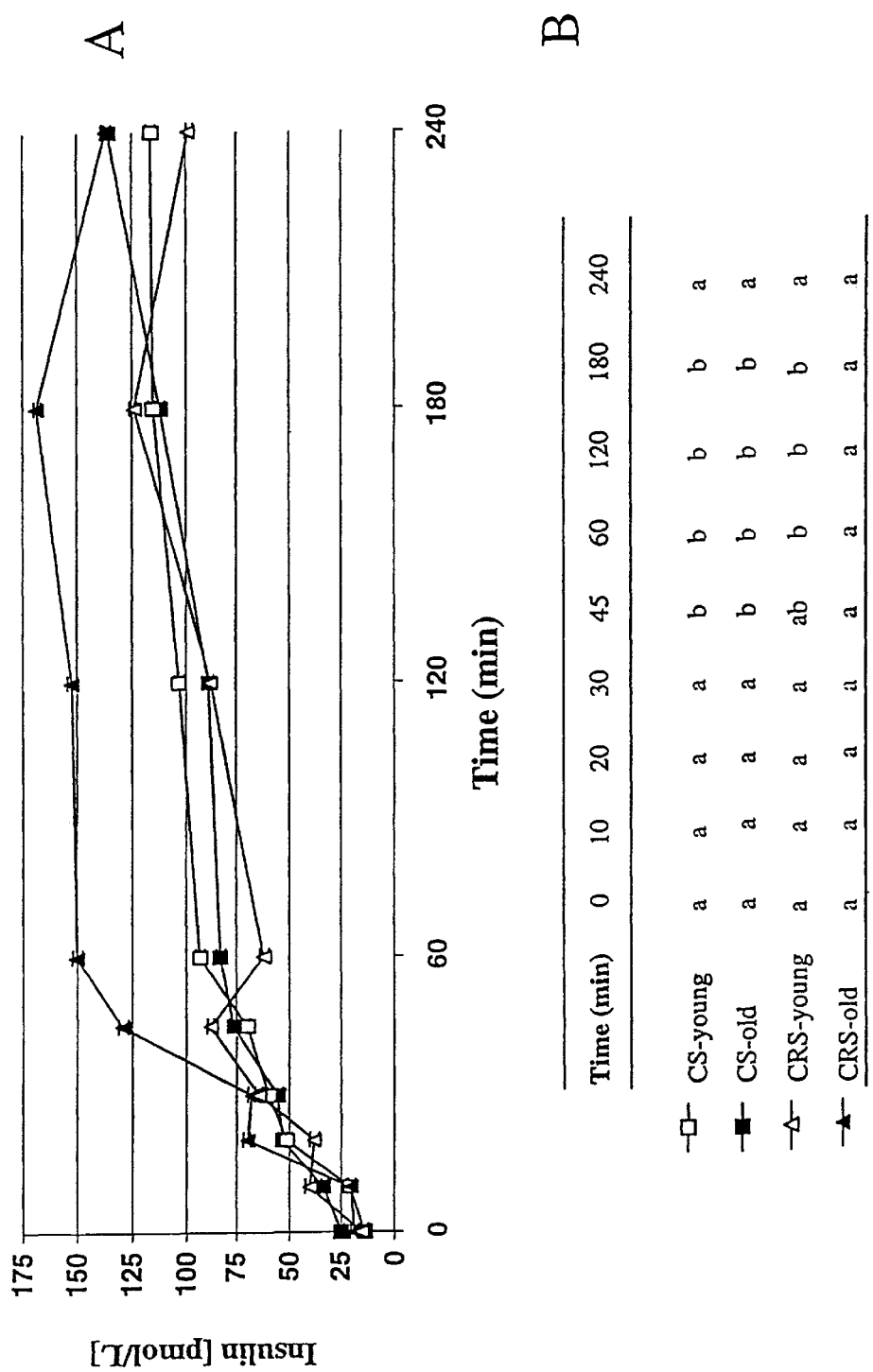
FIG. 6 is a graph of the age*diet interaction effect on plasma insulin curve (A) and corresponding statistical differences (B) in dogs after a meal.

Age, however did affect glucose (FIG. 3; p<0.001) and insulin (FIG. 4; p=0.05) responses. Besides significantly elevated fasting plasma glucose concentrations (4.9±0.1 mmol/L and 5.3±0.1 mmol/L, old and young animals, respectively; p<0.05; FIG. 3), younger animals exhibited a quicker rise in plasma glucose promptly followed by a pronounced decline upon a meal challenge compared with their older counterparts, which exhibited a continual increase in plasma glucose after 240 minutes. Postprandially, older animals exhibited exaggerated insulin secretion after 30 minutes. FIG. 5 shows the age*diet interaction effect on glucose, and FIG. 6 illustrates insulin responses. Young animals' plasma glucose responses to the CS and CRS diets were similar; however, CS-old animals had significantly lower peak plasma glucose concentrations at 60 minutes than CRS-old animals (5.3±0.2 mmol/L and 5.8±0.2 mmol/L, CS-old dogs and CRS-old dogs, respectively; p<0.05). As well, CS-old animals had significantly lower insulin responses than CRS-old animals (p<0.001).

Figure 8:
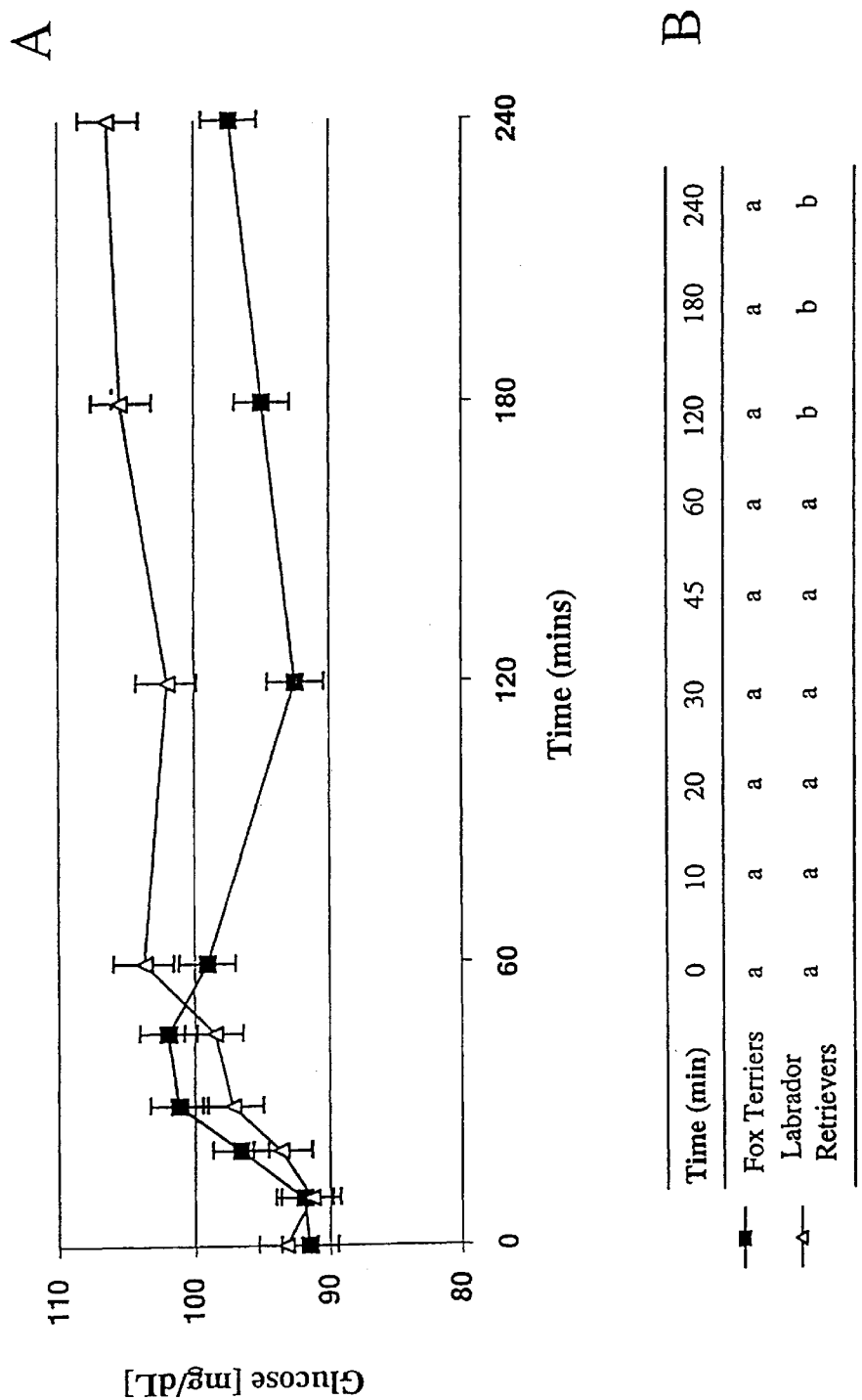
FIG. 8 is a graph of the effect of breed on plasma glucose levels (A) and corresponding statistical differences (B) in dogs after a meal.
Figure 9:
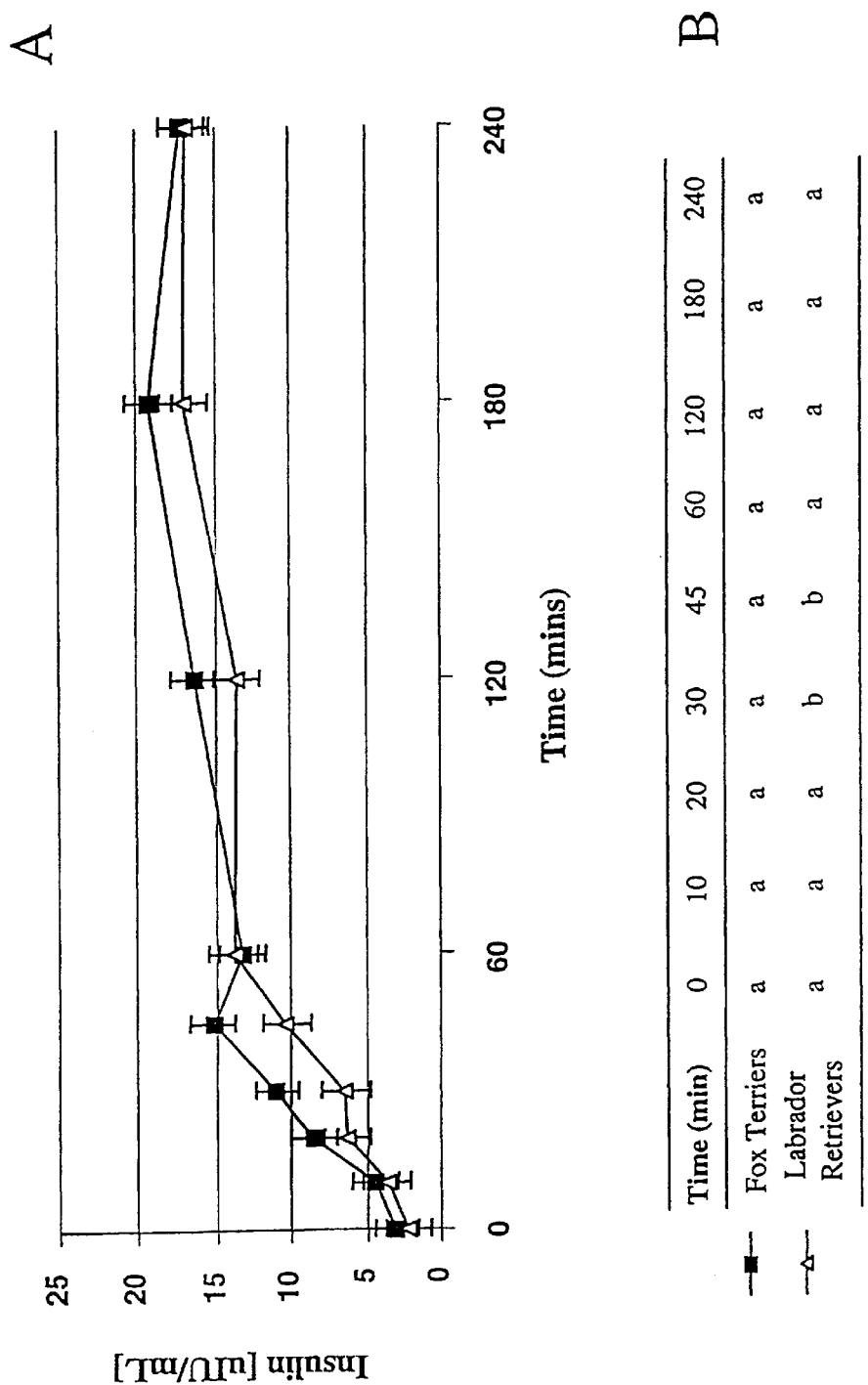
FIG. 9 is a graph of the effect of breed on plasma insulin levels (A) and corresponding statistical differences (B) in dogs after a meal.

Breed played a significant role regarding both glycemic and insulinemic responses. FT tended to exhibit a quicker rise in plasma glucose followed by a marked decrease, whereas LR showed a gradual and sustained rise in plasma glucose concentrations with significantly higher values at 120, 180 and 240 min (p<0.05; FIG. 8). FT showed a quicker rise in plasma insulin levels with significantly higher values at 30 and 45 minutes compared with LR (p<0.05; FIG. 9). Values for both FT and LR failed to reach baseline levels after 240 minutes.

Figure 10:
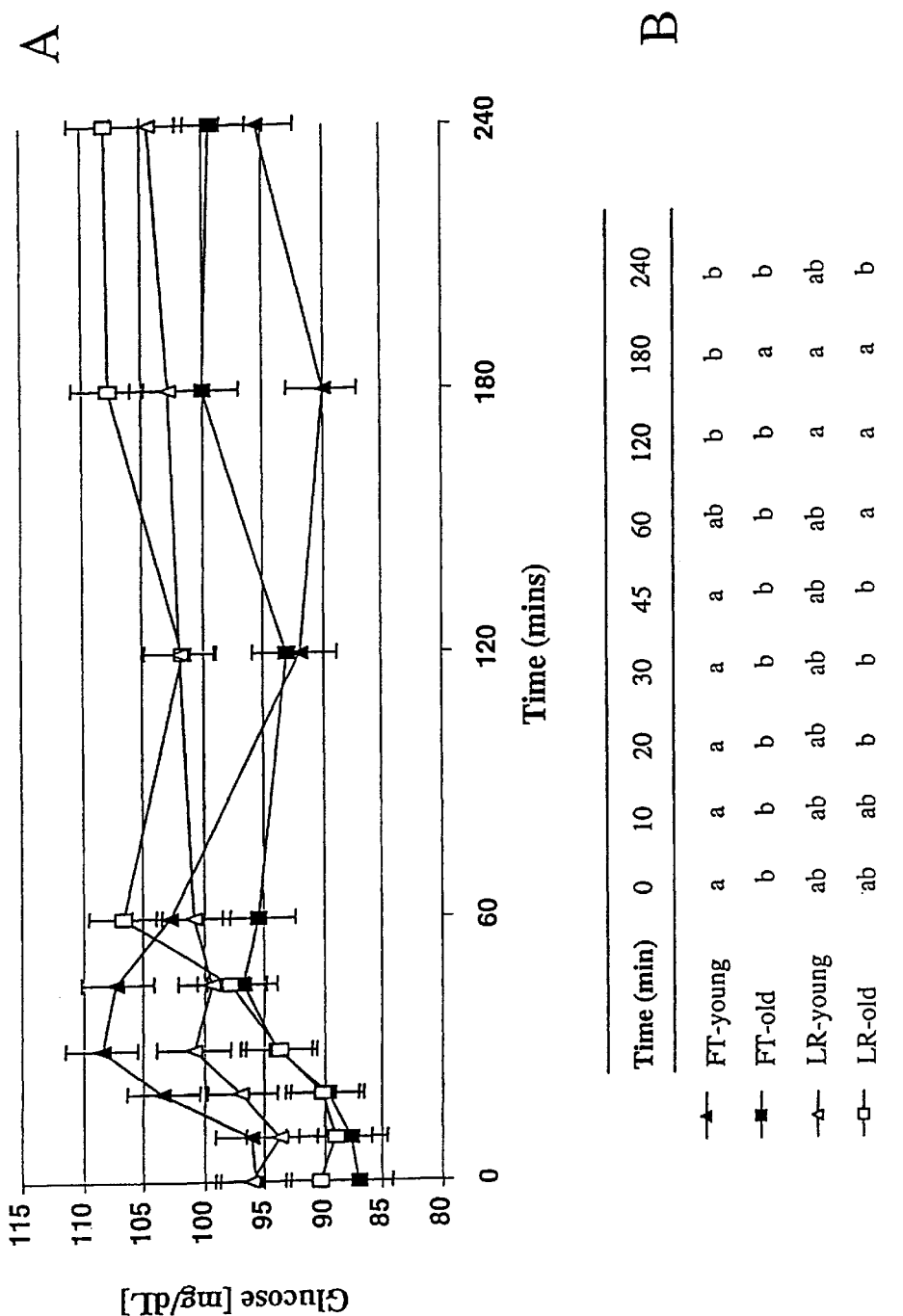
FIG. 10 is a graph of the age*breed effect on plasma glucose levels (A) and corresponding statistical differences (B) in dogs after a meal.

When age*breed interaction effects were noted, large differences were seen between FT with old FT having higher plasma glucose concentrations at 0, 10, 20, 30 and 45 minutes (p<0.05; FIG. 10) than young FT. Old FT blood glucose concentrations rose quicker, peaked higher and dropped markedly when compared to young FT, which exhibited a sustained and gradual rise in plasma glucose concentrations (FIG. 10). LR exhibited similar glycemic responses between young and old animals. Both displayed a gradual increase in blood glucose concentrations without significant differences at any time points (FIG. 10).

Figure 11:
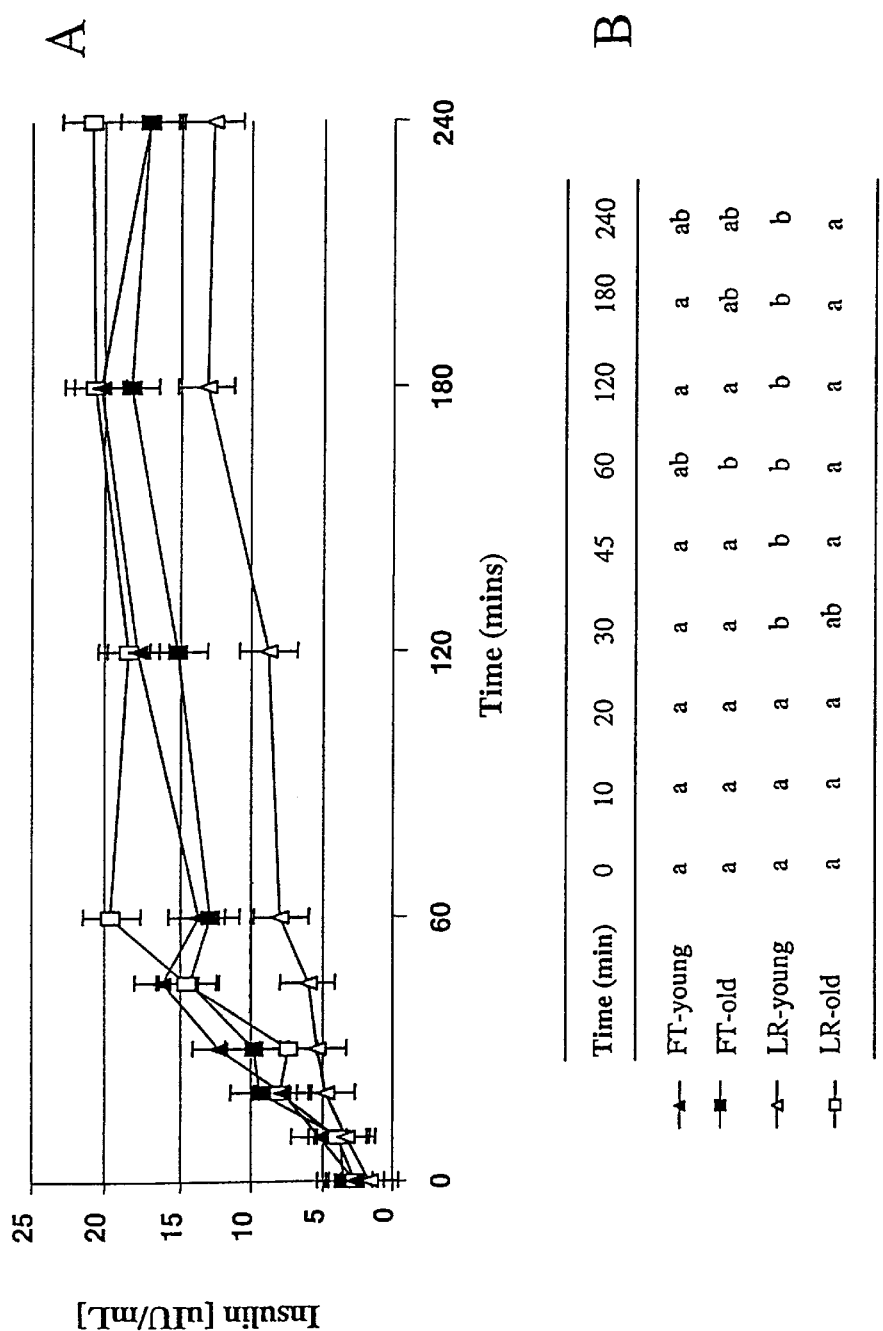
FIG. 11 is a graph of the age*breed effect on plasma insulin (A) and corresponding statistical differences (B) in dogs after a meal.

Age-related differences in insulin responses were greatest between old and young LR (FIG. 11). Although both young and old LR showed a continual rise overtime in plasma insulin, old LR had significantly higher insulin at 45, 60, 120, 180 and 240 minutes compared with young LR (p<0.05; FIG. 11). Both young and old FT exhibited similar gradual increases in plasma insulin; no significant differences were seen at any time points.

Figure 12:
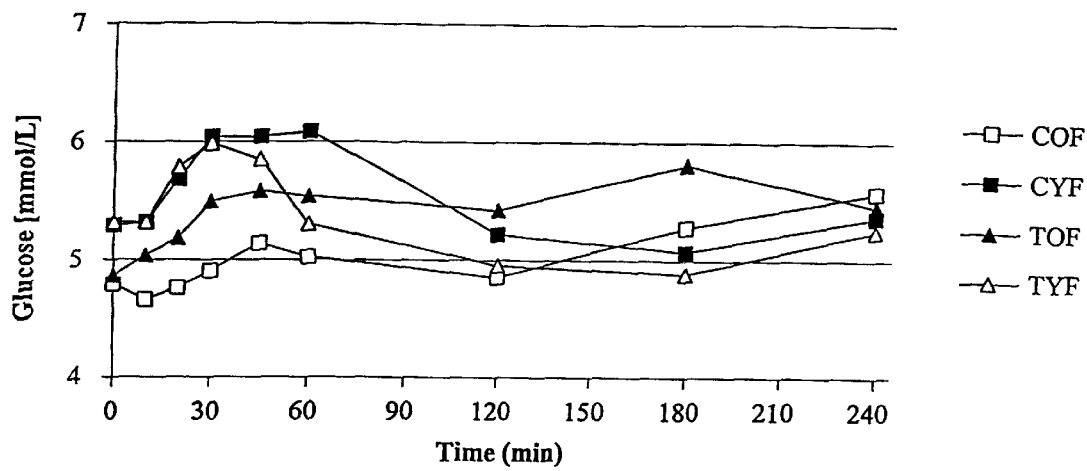
FIG. 12 is a graph of the effect of age, breed, and diet on postprandial glucose in fox terriers.
Figure 13:
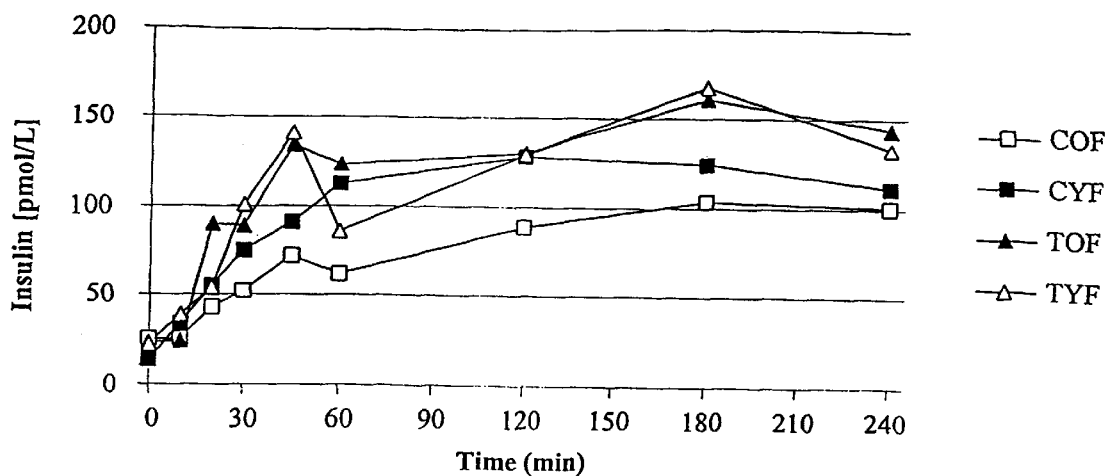
FIG. 13 is a graph of the effect of age, breed, and diet on postprandial insulin in fox terriers.

Age and breed effects are illustrated by the results shown in FIGS. 12–15. FIG. 12 shows the glucose response curve in Fox Terriers only, divided by age and diet effects. There data show little effect. However, FIG. 13 shows the insulin responses for the same dog. As shown, the old (geriatric) dogs on either the CS diet (open square) or the CRS diet (closed triangle), demonstrate that the absence of rice in the diet (CS) produced a markedly lower insulin response in these old Fox Terriers when compared to the CRS diet.

Figure 14:
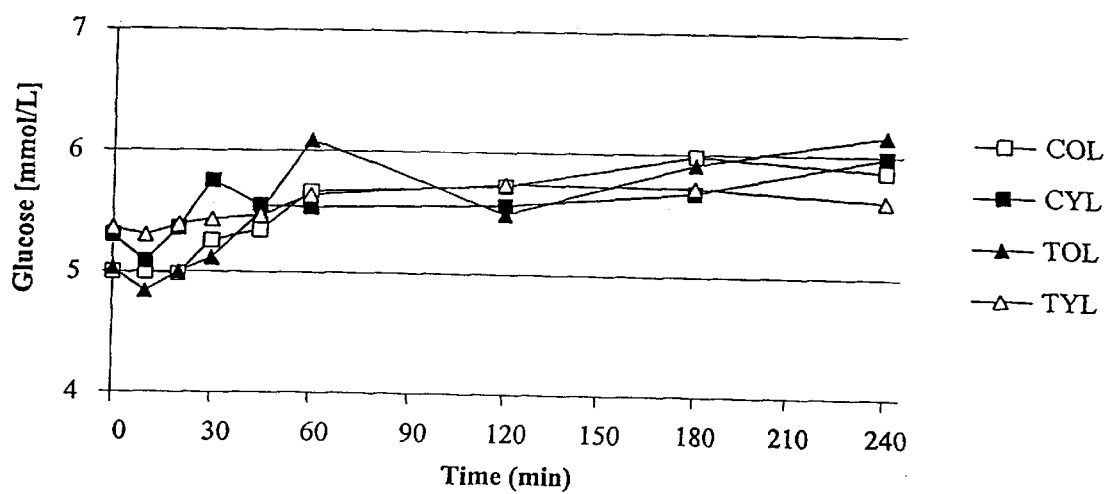
FIG. 14 is a graph of the effect of age, breed, and diet on postprandial glucose in Labrador retrievers.
Figure 15:
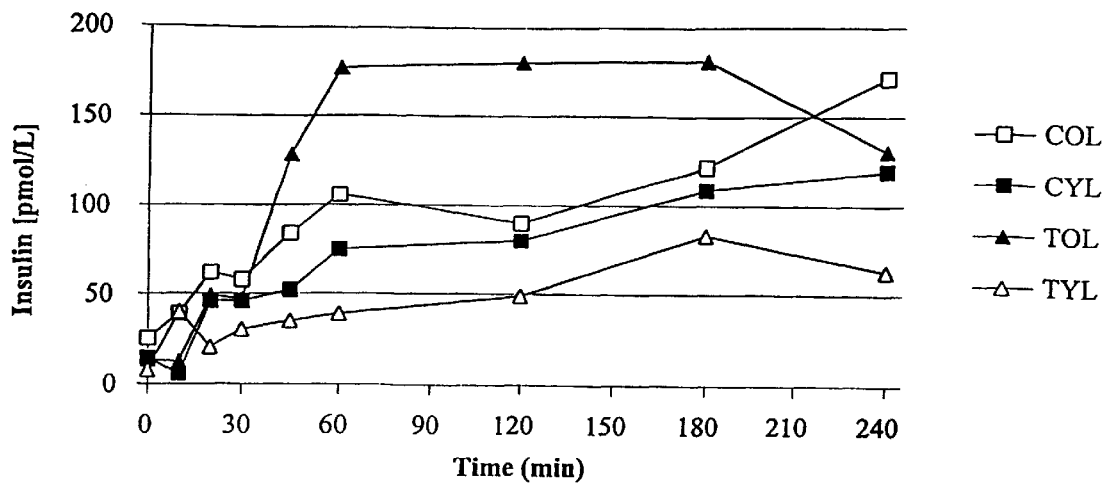
FIG. 15 is a graph of the effect of age, breed, and diet on postprandial insulin in Labrador retrievers.

FIGS. 14 and 15 illustrate the same data, only in Labrador Retrievers. Again, there is little difference in the glucose response curve (FIG. 14). However, the insulin response curve (FIG. 15) shows a remarkable effect. Old Labrador Retrievers that consumed the CRS (rice) diet (closed triangles) had a significantly elevated insulin response compared with the old Labrador Retrievers that consumed the CS diet (open squares). FIG. 15 also illustrates that, regardless of diet, the old Labrador Retrievers (open square and closed triangle) had elevated levels of insulin compared to the young Labrador Retrievers (closed square and open triangle).

Summarizing what is shown by FIGS. 12–15, the presence of rice in the diet is detrimental to old (geriatric) dogs with regard to their postprandial insulin responses. The data show that rice is even more detrimental to the larger breed, Labrador Retrievers. By removing rice as a starch source from the diet, these hyperinsulinemic responses are reduced. Although it has not been shown, prolonged hyperinsulinemia in old dogs may result in a further deterioration in glucose metabolism by producing eventual insulin resistance which can then lead to hyperglycemia. Thus, long term presence of rice in such dogs' diets may be detrimental.

Incremental Area Under the Curves (IUAC):

The IAUC was divided into three sections: acute phase (0–30 minutes), second phase (30–240 minutes), and total IAUC (sum of acute phase and second phase). The values for the IAUC are presented in Table 3 below.

Diet alone had no effect on total IAUC for plasma glucose ($99\pm29$ mmol*h/L and $89\pm30$ mmol*h/L CS and CRS, respectively; p=NS). Old animals had significantly elevated total IAUC for plasma glucose compared with young animals ($31\pm29$ mmol*h/L and $156\pm30$ mmol*h/L young and old animals, respectively; $p<0.01$), whereas young animals had significantly greater acute phase IAUC for plasma glucose ($6.3\pm1.2$ mmol*h/L and $3.0\pm1.2$ mmol*h/L, young and old animals, respectively; $p<0.05$). CRS-old had the highest glucose IAUC; however, CS-old had a total glucose IAUC that was not significantly different from that of CS-young ($p<0.05$). Although not significant, CRS-old tended ($p=0.09$) to have a higher total insulin IAUC than the other groups.

Figure 7:
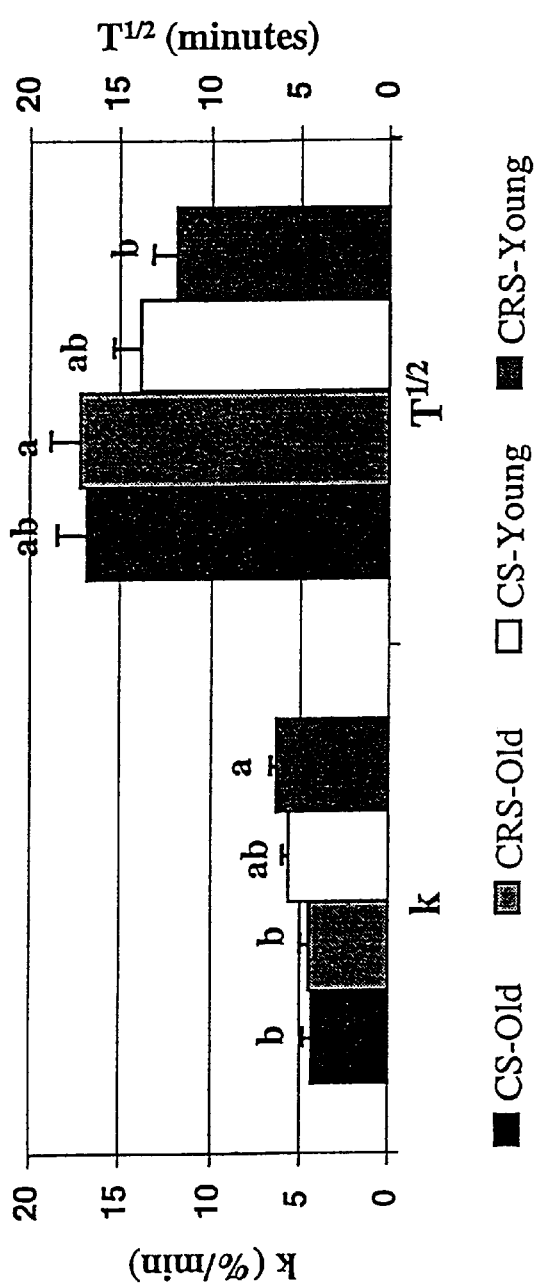
FIG. 7 is a graph of the effect of age and diet (A) and age*diet interactions (B) on the fractional rate of glucose turnover (k) and half-life ($T^{1/2}$) in dogs after a meal.

Fractional Glucose Turnover Rate and Half-Life:

As would be expected, older animals had a significantly lower fractional rate of glucose turnover (k) ($5.9\pm0.\%$/minute and $4.4\pm03\%$/minute, young and old animals, respectively; $p<0.01$), which translated in a significantly longer $T^{1/2}$ of glucose ($12.9\pm1.1$ minute and $17.0\pm1.1$ minute, young and old animals, respectively; $p<0.01$). Diet did not affect glucose k or $T^{1/2}$ (p=NS). CS-old or CRS-old did not differ significantly in k ($4.3\pm0.5\%$/minute and $4.5\pm0.5\%$ minute, CS-old and CRS-old, respectively; p=NS, FIG. 7 or $T^{1/2}$ ($16.9\pm1.6$ minute and $17.2\pm1.6$ min, CS-old and CRS-old, respectively; p=NS, FIG. 7.

Body Composition

Age was the only variable that significantly affected percent body fat ($16.8\pm1.1\%$ and $30.4\pm1.2\%$, young and old animals, respectively; $p<0.0001$). Diet and breed had no effect (p=NS. Body fat was significantly inversely correlated to k in FT, LR and CS-fed animals and significantly correlated to $T^{1/2}$ in CS- and CRS-fed animals as well as FT, and a strong positive association was noted for LR. See Table 4 below.

TABLE 3

Incremental area under the curve for plasma glucose and insulin in dogs[1]

|  | 0–30 min Glucose mmol*h/L | 30–240 min Glucose mmol*h/L | Total Glucose mmol*L | 0–30 min Insulin pmol*h/L | 30–240 min Insulin pmol*h/L | Total Insulin pmol*h/L |
|---|---|---|---|---|---|---|
| CS[2] Diet | 45 ± 12 | 940 ± 280 | 990 ± 290 | 538 ± 108 | 19781 ± 2683 | 20320 ± 2676 |
| CRS Diet | 48 ± 12 | 850 ± 290 | 890 ± 300 | 653 ± 115 | 23584 ± 2805 | 24266 ± 2791 |
| Old Dogs | 30 ± 12[a3] | 1530 ± 290[a] | 1560 ± 300[a] | 596 ± 115 | 23699 ± 2805 | 24287 ± 2791 |
| Young Dogs | 63 ± 12[b] | 250 ± 280[b] | 310 ± 290[b] | 596 ± 108 | 19667 ± 2683 | 20291 ± 2676 |
| Old-CS | 18 ± 17[b] | 1440 ± 400[ab] | 1450 ± 410[ab] | 438 ± 158 | 19057 ± 3796 | 19487 ± 3781 |
| Old-CRS | 42 ± 18[ab] | 1630 ± 43[a] | 1670 ± 440[a] | 753 ± 172 | 28334 ± 4133 | 29087 ± 4118 |
| Young-CS | 73 ± 17[a] | 440 ± 40[bc] | 520 ± 410[ab] | 639 ± 158 | 20506 ± 3796 | 21145 ± 3781 |
| Young-CRS | 53 ± 17[ab] | 64 ± 40[c] | 110 ± 410[b] | 552 ± 158 | 18834 ± 3796 | 19444 ± 3781 |

[1]Values expressed are x ± SEM; n = 18/treatment (young dogs, CS) and n = 17/treatment (old dogs, CRS), except interaction where n = 9/treatment (n = 8 for old-CRS treatment group).
[2]CS = corn/grain sorghum diet, CRS = corn/rice/grain sorghum.
[3]Values with differing superscripts within a variable*treatment column are significantly (p < 0.05) different.

TABLE 4

The effect of age, diet and breed on body composition and correlation to body fat in dogs

|  | % Body Fat[1] | Correlation with k[2] | p Value | Correlation with $T^{1/2}$ | p Value |
|---|---|---|---|---|---|
| Young Dogs | 16.8 ± 1.1[a] | −0.04 | p = NS | −0.10 | p = NS |
| Old Dogs | 30.4 ± 1.2[b] | −0.16 | p = NS | 0.16 | p = NS |
| CS | 23.9 ± 1.1 | −0.48 | p < 0.05 | 0.34 | p < 0.2 |
| CRS | 23.2 ± 1.1 | −0.45 | p < 0.1 | 0.40 | p < 0.1 |

TABLE 4-continued

The effect of age, diet and breed on body composition and correlation to body fat in dogs

|    | % Body Fat[1] | Correlation with k[2] | p Value | Correlation with $T^{1/2}$ | p Value |
|----|---------------|----------------------|---------|----------------------------|---------|
| FT | 23.6 ± 1.1    | −0.48                | p < 0.05 | 0.53                      | p < 0.05 |
| LR | 23.6 ± 1.1    | −0.53                | p < 0.05 | 0.42                      | p < 0.1  |

[1]Values for % body fat are expressed as x ± SEM; n = 18/treatment (young dogs, CS, FT) and n = 17/treatment (old dogs, CRS, LR).
[2]Correlation data is represented by Pearson's correlation coefficients. Values with different superscripts are significantly different (p < 0.05) within a treatment.
k = the fractional rate of glucose turnover, $T^{1/2}$ = half-life of glucose, CS = corn/grain sorghum, CRS = corn/rice/grain sorghum, FT Fox Terrier, LR = Labrador Retriever, NS = not significant.

Diet modification has been reported to increase longevity, improve insulin sensitivity and glucose tolerance, thereby suggesting that diet may be at least partially related to glucose intolerance in older animals and may play a role in the aging process. High-carbohydrate diets have been shown to improve insulin sensitivity to glucose, increase the glucose disappearance rate, and enhance second phase β-cell response to glucose stimulation. While most studies to date focus on altering quantity of carbohydrate in the diet, the experimental results suggest that source, particularly of starch, may be equally important. Starch source modulated the glycemic response in older dogs, independent of percent body fat and glucose kinetics. Although diet had no effect on glucose tolerance, the absence of rice as a starch source in the diet lowered postprandial insulin secretion. Therefore, the removal of rice (a high glycemic starch) from the diet provides a beneficial preventive nutritional strategy.

Starch source may be even more important with aging as the CRS-old dogs in the experiments had elevated, albeit nonsignificant, IAUC for plasma glucose and significantly higher insulin IAUC than the CS-old dogs. These responses must be due to a yet-unidentified effect independent of body composition and glucose kinetics. The importance of the glucose kinetic data is twofold. First, it confirms that this population of dogs is healthy without the confounding influence of disease such as diabetes mellitus. Second, it confirms that the effect of diet on glucose and insulin in older animals is an independent effect. The experimental results show a lower glucose IAUC for CRS-young dogs compared with CS-young dogs. However, there were a high number of negative IAUCs for the CRS-young group. When all negative values were excluded from analysis, glucose IAUC values clearly became more representative of what would be expected in young dogs on the basis of previous literature, (732±394 mmol*h/L and 1099±607 mmol*h/L for CS-young and CRS-young dogs, respectively; p=NS).

When considering nutritional therapy for different life stages and physiologic states, nutrient absorption and utilization must be considered. However, an altered potential for nutrient digestion and/or absorption between young and old dogs does not explain the age-associated differences in the glycemic responses which were observed. The effect of age on intestinal absorption of nutrients has been previously examined in the dog; nutrient balance experiments on young and old Beagles found no observable age-related differences in protein, fat, starch, vitamin and mineral absorption, suggesting the gastrointestinal tract can compensate for small decreases in absorptive capacity. Indeed, gastrointestinal adaptation has been previously demonstrated in other conditions, such as small bowel syndrome.

Because absorption has not been shown to be a major factor in glucose intolerance during aging, the GR protocol that uses one-half of each animal's daily meal allowance was chosen. Some studies use a standard glucose load, whereas in others, a meal is offered. But because of the interest in evaluating the glycemic response to a total diet matrix rather than the independent effects of starch sources, the meal protocol was chosen. The animals were fed equal amounts within dietary treatment groups on a gram feed per kg body weight basis. Although total quantities varied on an individual basis, when expressed on a gram feed per kg body weight basis, all animals received similar amounts.

Age-related species variations may also occur with baseline glucose values. Younger dogs exhibited higher baseline glucose values than their older counterparts, an observation previously noted for this particular colony of dogs. Although these data are in disagreement with previous literature, other researchers have reported no difference between young and old subjects and baseline glucose. Indeed, when dealing with an elderly population, avoiding confounding factors such as disease states (e.g., diabetes mellitus) is difficult.

Glucose metabolism is known to decline with aging, ultimately manifesting itself as hyperglycemia and hyperinsulinemia. Over time, hyperinsulinemia can lead to insulin resistance and, eventually, glucose metabolism dysfunction. Hyperglycemia interconnects two theories of aging, the free radical and glycosylation theories, both of which can modulate changes in gene expression that result in the emergence of phenotypic changes of aging. These two cellular-based theories deal with the "wear and tear" concept of aging, wherein senescence is the result of wearing down of somatic cells following continuous use and function. Other theories are population-based (rate of living; i.e., development and maturation, determines longevity) or organ-based (impairment of certain organs in the body; i.e., endocrine and immune organs, affects aging). The glycosylation and free radical theories of aging are especially relevant.

The glycosylation theory of aging states that hyperglycemia may accelerate the aging process by increasing the amount of glucose available to bind with proteins. Glucose adduction to lysine residues followed by the Maillard reaction results in an important post-translational modification of proteins, the formation of advanced glycation end products (AGE). Consequences of protein glycosylation include a reduction of protein digestibility and turnover, cross-linking resulting in increased tissue rigidity, reduced enzymatic activity (such as $Na^+K^+$ ATPase), altered protein antigenicity and altered receptor-ligand interactions. Protein glycosylation secondary to hyperglycemia has been linked to many complications including accelerated atherogenesis in persons with diabetes, skin/joint changes and retinopathy. AGE accumulations have been related to altered nerve conduction velocity and increased secretion of various cytokines (tumor necrosis factor-β and interleukin I-β). One additional potential mechanism for tissue damage associated with glycosylation is the generation of free radicals. Glucose, in the presence of $CuSO_4$, undergoes autooxidation thereby generating free radicals in vitro. As well, protein glycosylation itself results in the production of free radicals and partial degradation of proteins.

The free radical theory of aging implicates free radicals in the pathogenesis of the aging process as well as chronic human diseases associated with aging including inflammatory diseases, cataracts, diabetes mellitus and cardiovascular diseases. Certain free radicals attack vital cell components, injure cell membranes, inactivate enzymes and damage genetic material in the cell nucleus. Antioxidants quell free radicals, and it has been reported that treatment with antioxidants extended the life span of mice, although other researchers could not confirm this and suggested the study may have been confounded by calorie restriction.

Normalizing glycemic control is currently the technique used for preventing protein glycosylation and hyperglycemia-induced free radical production. Proper selection of starch sources helps to normalize glycemic control by lowering postprandial glucose and insulin secretion in an older population. Therefore, proper selection of a starch source is needed when attempting to modulate postprandial hyperglycemia and hyperinsulinemia through nutrition in groups at increased risk, such as an aged population.

EXAMPLE 2

The same animals and diets as described in Example 1 were used; see Tables 1 and 2. The test procedures were as reported in Example 1. In this experiment, the effects of age on glucose metabolism were studied.

As in Example 1, animals were fed to maintain ideal body weight. Individual animals did not fluctuate significantly in body weight. Animal weight did not differ by diet (19.5±0.9 kg vs. 20.8±0.9 kg, CS and CSR respectively, p NS) or age (20.1±0.9 kg vs. 20.3±0.9 kg, old and young animals respectively, p=NS). However, breed did significantly affect weight (31.9±0.9 kg vs. 8.5±0.9 kg, LR and FT, respectively, p<0.0001).

When dietary intake is expressed on a grams of feed per kg body weight basis, no effect from diet was seen (19.3±0.7 g/kg body weight vs. 20.2±0.7 g/kg body weight, CS and CSR respectively, p=NS). As would be expected, both age (22.2±0.7 g/kg body weight vs. 17.3±0.7 g/kg body weight, young and old animals respectively, p<0.001) and breed (15.6±0.7 glkg body weight vs 23.9±0.7 g/kg body weight, LR and FT respectively, p<0.001) significantly affected dietary intakes.

Age was the only variable which significantly affected % body fat (30.4±1.2% vs. 16.8±1.2%, old and young animals respectively, p<0.0001, see Table 5). No significant differences existed within diet and breed (p=NS). Whole body fat (%; Table 5) was negatively correlated with insulin sensitivity (−0.21, p=NS), glucose effectiveness (−0.39, p<0.05) and glucose effectiveness at zero insulin (−0.39, p<0.05) but was positively correlated with the acute insulin response to glucose (0.37, p<0.05). Significant age*diet and age*breed interaction effects were also seen as shown in Table 5.

Using Bergman's minimal model method, insulin sensitivity (Si), glucose effectiveness (Sg), acute insulin response to glucose (AIRg), and the glucose disappearance rate (G(0)) are measured by mathematical modeling. Sg is defined as the efficiency by which glucose can restore its own concentration independent of any dynamic insulin response. These insulin-dependent mechanisms of glucose restoration involve the mass action effect of glucose on peripheral utilization. This parameter represents the fractional glucose turnover at basal insulin. Or, quantitative enhancement of glucose disappearance due to an increase in plasma glucose concentration. G(0) is defined as the glucose concentration at t=0 estimated by extrapolating the prediction of the glucose kinetics model to the moment of injection. AIRg is defined as the acute insulin response to glucose. Si is defined as the increase in fractional glucose disappearance per unit insulin concentration increase. In healthy individuals, there is a balance between insulin secretion and sensitivity such that secretion x sensitivity=constant.

For the oral glucose tolerance test (OGTT), after consumption of a meal, plasma glucose and insulin were measured at −10, 0, 10, 20, 30, 45, 60, 120, 180, and 240 minutes. For the intravenous glucose tolerance test (IVGTT), the jugular vein of the animal is catheterized and 2 ml blood samples are removed at the above time points. An advantage to an IVGTT versus an OGTT is that an IVGTT is not complicated by differing rates of intestinal glucose absorption. At time 0, glucose (0.5 g/kg body weight, 30% solution) was infused. At 20 minutes, human insulin (0.02 units/kg body weight) was infused. Plasma glucose and insulin concentrations were measured at all time points, and the data was analyzed by Bergman's mathematical model for Sg, G(0), AIRg, and Si.

Diet or breed did not significantly affect any Minimal Model parameters; see Table 6. However, there was a trend for CSR-fed animals to have an elevated G(0) (324±25 mg/dL vs. 391±25 mg/dL, CS and CSR diet respectively, p=0.09). FT tended to have a higher Sg than LR (0.09±0.01 min$^{-1}$ vs. 0.07±0.01 min$^{-1}$, FT and LR diet respectively, p=0.10). Age did significantly affect Sg. Old dogs had significantly lower Sg than young animals, (0.07±0.01 min$^{-1}$ vs. 0.09±0.01 min$^{-1}$, old and young dogs respectively, p<0.05), tended to have a higher AIRg (253±25 μIU/ml vs. 198±23 μIU/ml, old and young dogs respectively, p=0.10) and lower G(0) (326±26 mg/dL vs. 389±24 mg/dL, old and young dogs respectively, p=0.09). Young CSR-fed dogs exhibited a significantly higher Sg than old-CS fed dogs (0.11±0.01 min$^{-1}$ vs. 0.06±0.01 min$^{-1}$, CSR-young and CS-old dogs respectively, p<0.05) and G(0) (431±34 mg/dL vs. 301±37 mg/dL, CS and CSR diet respectively, p<0.05). CSR-fed FT had a significantly elevated Sg compared to CS-fed LR (0.10±0.01 min$^{-1}$ vs. 0.06±0.01 min$^{-1}$, CSR FT and CS-LR dogs respectively, p<0.05). Young LR exhibited a higher Si than old LR (11.5±2.3×10$^{-4}$ min/μIU/ml vs. 3.9+2.3×10$^{-4}$ min/μIU/ml, young LR and old LR dogs respectively, p<0.05) and had a higher G(0) (408±34 mg/dL vs. 304±37 mg/dL, young LR and old LR respectively, p<0.05). Young FT had significantly higher Sg than old LR (0.10±0.01 min$^{-1}$ vs. 0.05±0.01 min$^{-1}$, young FT and old LR dogs respectively, p<0.05).

TABLE 5

Correlation analysis between various treatments and whole body fat (%) in dogs

| Parameter | % Body Fat | Correlation to % Body Fat | | | |
|---|---|---|---|---|---|
| | | Si | Sg | AIRg | G(0) |
| Overall | 23.6 ± 1.4 | −0.21 | −0.39* | 0.37* | −0.39* |
| CS | 23.9 ± 1.1 | −0.39 | −0.42 | 0.33 | −0.39 |
| CSR | 23.2 ± 1.1 | −0.04 | −0.40 | 0.42 | −0.43 |
| Young dogs | 16.8 ± 1.1[b] | 0.13 | −0.46 | 0.23 | −0.33 |
| Old dogs | 30.4 ± 1.2[a] | −0.11 | −0.03 | 0.18 | −0.30 |
| FT | 23.6 ± 1.1 | 0.15 | −0.28 | 0.23 | −0.28 |
| LR | 23.6 ± 1.1 | −0.49 | −0.52 | 0.54 | −0.47 |

TABLE 5-continued

Correlation analysis between various treatments and whole body fat (%) in dogs

| | | Correlation to % Body Fat | | | |
|---|---|---|---|---|---|
| Parameter | % Body Fat | Si | Sg | AIRg | G(0) |
| Young-CS | 16.6 ± 1.5$^b$ | 0.06 | 0.01 | 0.30 | −0.07 |
| Young-CSR | 16.9 ± 1.5$^b$ | −0.03 | −0.58 | 0.30 | −0.39 |
| Old-CS | 31.2 ± 1.7$^a$ | −0.58 | −0.18 | 0.40 | −0.15 |
| Old-CSR | 29.5 ± 1.7$^a$ | 0.16 | −0.86* | −0.02 | −0.58 |
| Young-FT | 15.9 ± 1.5$^b$ | 0.27 | 0.16 | 0.21 | 0.06 |
| Young-LR | 17.6 ± 1.5$^b$ | −0.38 | −0.79* | 0.71 | −0.68* |
| Old-FT | 31.2 ± 1.7$^a$ | 0.10 | −0.57 | 0.06 | −0.71* |
| Old-LR | 29.6 ± 1.7$^a$ | −0.72* | −0.69* | 0.51 | −0.57 |
| CS-FT | 23.5 ± 1.7 | 0.20 | 0.27 | −0.04 | 0.05 |
| CS-LR | 24.4 ± 1.5 | −0.92** | −0.67* | 0.59 | −0.64* |
| CSR-FT | 23.7 ± 1.5 | 0.18 | −0.51 | −0.08 | 0.04 |
| CSR-LR | 22.8 ± 1.7 | −0.13 | −0.73* | 0.45 | −0.65 |

Data for body fat is expressed as mean ± SEM (n = 36 total, n = 18/single treatment group and n = 9/interaction treatment group; however an Old-CSR-LR was removed from the study therefore n = 35/17/8 for respective treatment groups) and data for correlation's are expressed as Pearson Correlation coefficients. In body fat data set, values which do not share similar superscripts are significantly different (p < 0.05). For correlation data set, * indicates (p < 0.05) and ** indicates (p < 0.01). Si = insulin sensitivity, Sg = glucose effectiveness, AIRg = acute insulin response to glucose, G(0) = glucose concentration at t = 0 estimated by extrapolating the prediction of the glucose kinetics model to the moment of injection (thus cardiovascular mixing is not included), CS = corn/grain sorghum diet, CSR = corn/grain sorghum/rice diet, FT = Fox Terriers, LR Labrador Retrievers.

TABLE 6

Bergman's Minimal Model data in dogs

| Variable | Si 10$^{-4}$ min/μIU/ml | Sg min$^{-1}$ | AIRg μIU/ml | G(0) mg/dl |
|---|---|---|---|---|
| CS | 7.8 ± 1.7 | 0.07 ± 0.01 | 224 ± 24 | 324 ± 25* |
| CSR | 8.1 ± 1.7 | 0.09 ± 0.01 | 227 ± 24 | 391 ± 25 |
| FT | 8.1 ± 1.7 | 0.09 ± 0.01* | 210 ± 24 | 360 ± 25 |
| LR | 7.7 ± 1.7 | 0.07 ± 0.01 | 241 ± 24 | 356 ± 25 |
| Old | 6.2 ± 1.8 | 0.07 ± 0.01$^a$ | 253 ± 25* | 326 ± 26* |
| Young | 9.6 ± 1.6 | 0.09 ± 0.01$^b$ | 198 ± 23 | 389 ± 24 |
| CS-Old | 5.0 ± 2.5 | 0.06 ± 0.01$^b$ | 247 ± 35 | 301 ± 37$^b$ |
| CS-Young | 10.5 ± 2.3 | 0.08 ± 0.01$^{ab}$ | 202 ± 32 | 347 ± 34$^{ab}$ |
| CSR-Old | 7.4 ± 2.5 | 0.07 ± 0.01$^{ab}$ | 260 ± 35 | 351 ± 37$^{ab}$ |
| CSR-Young | 8.8 ± 2.3 | 0.11 ± 0.01$^a$ | 194 ± 32 | 431 ± 34$^a$ |
| CS-FT | 7.8 ± 2.5 | 0.08 ± 0.01$^{ab}$ | 205 ± 35 | 321 ± 37 |
| CS-LR | 7.7 ± 2.3 | 0.06 ± 0.01$^b$ | 243 ± 32 | 328 ± 34 |
| CSR-FT | 8.5 ± 2.3 | 0.10 ± 0.01$^a$ | 214 ± 32 | 399 ± 34 |
| CSR-LR | 7.7 ± 2.5 | 0.08 ± 0.01$^{ab}$ | 240 ± 35 | 384 ± 37 |
| Old-FT | 8.5 ± 2.5$^{ab}$ | 0.09 ± 0.01$^{ab}$ | 230 ± 35 | 349 ± 37$^{ab}$ |
| Old-LR | 3.9 ± 2.5$^b$ | 0.05 ± 0.01$^b$ | 277 ± 35 | 304 ± 37$^b$ |
| Young-FT | 7.8 ± 2.3$^{ab}$ | 0.10 ± 0.01$^a$ | 190 ± 32 | 371 ± 34$^{ab}$ |
| Young-LR | 11.5 ± 2.3$^a$ | 0.09 ± 0.01$^{ab}$ | 206 ± 32 | 408 ± 34$^a$ |

Values are means±SEM (n=18/single treatment group and n=9/interaction treatment group; however an Old-CSR-LR was removed from the study therefore n=35/17/8 for respective treatment groups), values with different superscripts are significantly different (p<0.05) within a treatment. Values with*indicate a trend (p≦0.1) within a treatment. Si=insulin sensitivity, Sg=glucose effectiveness, AIRg=acute insulin response to glucose, G(0)=glucose concentration at t=0 estimated by extrapolating the prediction of the glucose kinetics model to the moment of injection (thus cardiovascular mixing is not included), CS=corn/grain sorghum diet, CSR=corn/grain sorghum/rice diet, FT=Fox Terrier, LR=Labrador Retriever.

Similar to the human population, the segment of older companion animals is substantial as demonstrated by recent demographic surveys conducted in the United States and the United Kingdom. In agreement with human studies, geriatric pets require a decreased total daily energy requirement. Inactivity alone may cause a decrease of up to 20% of the pet's total daily energy requirement. This decrease, coupled with the natural slowing of the basal metabolic rate, can result in a total reduction in energy needs of up to 30–40%.

Although many factors contribute to impaired glucose tolerance, two have been recognized as playing a major role: pancreatic responsivity and insulin sensitivity. The former relates to the ability of pancreatic β-cells to secrete insulin in response to glucose stimuli whereas the latter is dependent upon the capability of insulin to increase glucose uptake in muscles, liver and adipose tissue. Defects in either or both of these factors can lead to impaired glucose tolerance, or if severe enough, to overt diabetes mellitus. Therefore, maintaining and/or improving these factors is a primary goal in improving glucose tolerance and preventing diabetes mellitus, especially in those groups at increased risk.

Aging is associated with deterioration in glucose tolerance which has been reported as secondary to obesity and decreased physical activity. These age differences have been abolished by feeding a high carbohydrate diet. However, in the veterinary spectrum, feeding companion animals a high carbohydrate is impractical. In order for an animal to maintain weight, caloric and nutritional needs must be derived from protein, carbohydrates and fat. If one component is increased, the other two must be reduced in order to compensate, thereby reducing the essential nutrients derived from these dietary sources.

This experiment demonstrated the effects of age and breed on glucose tolerance. Since body fat remained unchanged between diets and breed, and it has been reported that carbohydrate absorption is not changed with increasing age, an unidentified adiposity independent effect must be responsible for the changes in glucose tolerance seen in this experiment. Differences between breeds were noted for glucose and insulin responses during a glycemic response test. In this experiment, differences were found between breeds for Sg.

EXAMPLE 3

Twenty-one geriatric beagle dogs were studied to evaluate the glycemic response for three different diets. The study consisted of four periods (baseline and three experimental periods). The dogs received a standard diet during the baseline period. Following the baseline period, the dogs were randomly assigned to three groups of seven dogs each. The groups remained consistent throughout the experimental periods. Three test diets were evaluated during the experimental periods in a cross over design between groups. Each diet contained corn, sorghum (also referred to as grain sorghum and milo) and one of the following starches: barley, oats, or rice. All animals received each of the three test diets.

Each period consisted of a two week stabilization period where either the baseline diet or one of the test diets was offered. A glycemic response test (a general term describing the glucose and insulin response to a meal) was performed during the third week. Resulting samples were assayed for insulin and glucose. Stool characteristics were also obtained during each period.

The dogs were weighed weekly and a glycemic response was performed at the end of each period. Glucose and insulin levels were determined at baseline and at 10, 20, 30, 45, 60, 120, 180, and 240 minutes postprandial. Stool characteristics were obtained for one week during the second week of each period.

Animals, husbandry: Twenty-one healthy geriatric Beagle dogs (Covance, Cumberland, Va. of which 19 were female and two were male were used in this experiment. The dogs were treated humanely and ethically during the entire study period. All the animals were current on their vaccination and parasite prevention program. The dogs were housed individually in oversize pens and identified by a unique ear tattoo. Fresh water was provided ad libitum during the entire study period. The average body weight of the dogs was 12.83 kg (range: 9.93 to 18.85 kg) and the average age was 9.44 years (range: 6.86 to 13.10 years) at the initiation of the study. The dogs were fed ad libitum for 30 minutes each day during the experimental period. The dogs appeared to adjust very well to a limited time of food presentation. One of the dogs was euthanized due to a cervical disc problem. Another dog became sick and no data was collected for the last two periods of the study. Another dog was diagnosed with diabetes and the data generated from this dog was discarded. No other animals were sick or required medical attention during the study period.

The experiment consisted of a baseline, period and a treatment period of three replicates evaluating three dietary treatments in a cross over design. During the three-week baseline period all 21 geriatric dogs received a standard diet and the dogs were gradually trained to consume their food within approximately 30 minutes. At the end of the baseline period, the dogs were randomized based on body weight into three dietary treatment groups of seven dogs. Each replicate lasted three weeks and the dog groups were assigned to a different dietary treatment during each replicate, thus, each dog received each of the three dietary treatments during the experimental period. A glycemic response test was performed at the end of each replicate and at the end of the baseline period. The animals were weighed weekly throughout the study. Fecal scores were collected for one week (the second week) of the baseline period and the second week of each replicate.

Food intake was monitored daily during the entire study and the difference in grams between the food offered and the left over food was recorded as the amount consumed in one day for each dog. During the baseline period, the dogs were fed to maintain body weight and were gradually trained to consume their ad libitum meal within a 30-minute period in preparation for the glycemic challenges. During the experimental period, the same feeding regimen was maintained and the dogs were fed at approximately the same time each day.

The body weights of the dogs were measured weekly before feeding in the morning. Scales with dynamic weighing mode (Mettler Toledo KB60s platform with a 1D1s Multirange indicator [60,000 g×1 g] or Mettler Toledo SM34-K scale [32,000 g×1.0 g], Toledo Ohio) were used to measure body weights. The stool characteristics of the dogs were observed for seven consecutive days during the second week of the baseline period and each replicate of the experimental period. Fecal scores were assigned according to Table 7.

TABLE 7

Definition of the fecal score system.

| Fecal Score | Stool Description |
|---|---|
| 0 | No stool |
| 1 | Liquid with or without particulate matter |
| 2 | Soft, shapeless |
| 3 | Soft, with shape |
| 4 | Firm, well formed |
| 5 | Extremely dry |

Glycemic response tests were performed at the end of the baseline period and the end of each replicate. The dogs were fasted for at least 12 hours prior to the initiation of the glycemic response test. Two baseline samples were collected approximately ten minutes apart from the jugular vein directly into sodium heparinized evacuated tubes (Vacutainerm, Becton Dickinson, Sunnyvale, Calif. Immediately after the last baseline sample was collected, each dog was fed an individually precalculated amount of food (i.e., half the daily average for the previous four days prior to the baseline challenge) and allowed a maximum of 30 minutes to eat the experimental diets. Dogs not consuming the experimental diet within 30 minutes were excluded from the glycemic test for that day and retested the next day. Time 0 corresponded to the end of the food intake. Once food consumption was terminated, the cephalic vein was catheterized aseptically. Additional blood samples were collected at 10, 20, 30, 45, 60, 120, 180 and 240 minutes after the food was consumed. The blood samples were collected in syringes and transferred into sodium heparinized evacuated tubes. The blood samples were centrifuged at approximately 3000 xg for 20 minutes and two plasma aliquots from each time point were frozen. Plasma glucose concentrations (mg/dl) were determined by hexokinase enzyme method (Cobas Mira, Roche Diagnostic System, Somerville, N.J.) and insulin concentrations ($\mu$IU/ml) were determined by standard radioimmunoassay method using RIA kit (DPC Diagnostic Products Corp., Los Angeles, Calif.).

The ingredient compositions of the experimental diets are presented in Table 8 with nutrient composition presented in Table 9. During the study periods, three experimental diets were evaluated.

TABLE 8

Ingredient composition of experimental diets

| | RICE diet | BARLEY diet | OAT diet |
|---|---|---|---|
| | | g/kg | |
| Beet Pulp | 4.0 | 4.0 | 4.0 |
| Brewers dried yeast | 1.0 | 1.0 | 1.0 |
| Vitamin mix[1] | 0.2 | 0.2 | 0.2 |
| Dried whole egg | 1.0 | 1.0 | 1.0 |
| Poultry fat | 4.4 | 5.4 | 4.4 |
| Sodium chloride | 0.1 | 0.1 | 0.1 |
| DL-methionine | 0.2 | 0.2 | 0.2 |
| Poultry by-product meal | 33.2 | 25.4 | 27.3 |
| Dicalcium phosphate | 0.5 | 0.7 | 0.6 |
| Calcium carbonate | 0.7 | 1.0 | 1.0 |
| Potassium chloride | 0.4 | 0.6 | 0.5 |
| Choline chloride (60%) | 0.2 | 0.3 | 0.2 |
| Monosodium phosphate | 0.4 | 0.6 | 0.5 |
| Menhaden oil | 0.5 | 0.5 | 0.5 |
| Ground flax | 1.0 | 1.0 | 1.0 |
| Mineral mix[2] | 0.3 | 0.3 | 0.3 |
| Biodigest | 2.0 | 2.0 | 2.0 |
| Fructooligosaccharides | 0.3 | 0.3 | 0.3 |
| Ground corn | 16.5 | 18.4 | 18.3 |
| Grain sorghum | 16.5 | 18.4 | 18.3 |

TABLE 8-continued

Ingredient composition of experimental diets

|  | RICE diet | BARLEY diet | OAT diet |
|---|---|---|---|
|  | g/kg | | |
| Brewers Rice | 16.5 | — | — |
| Barley | — | 18.4 | — |
| Oats | — | — | 18.3 |

[1]Provides the following on a 92.5% dry matter basis: 15.6 KIU/kg vitamin A, 937 IU/kg vitamin D, 75.4 IU/kg vitamin E, 128.7 mg/kg ascorbic acid, 11 mg/kg thiamin, 34.3 mg/kg riboflavin, 21.5 mg/kg pantothenic acid, 58.5 mg/kg niacin, 7.4 mg/kg pyrodoxine, 1.2 mg/kg folic acid, 0.4 mg/kg biotin, 0.15 mg/kg vitamin $B_{12}$.
[2]Provides the following on a 92.5% dry matter basis: 213 mg/kg magnesium, 412 mg/kg iron, 34.5 mg/kg copper, 61.6 mg/kg manganese, 227.8 mg/kg zinc, 3.48 mg/kg iodine, 0.27 mg/kg selenium.

TABLE 9

Nutrient composition of experimental diets

|  | RICE diet | BARLEY diet | OAT diet |
|---|---|---|---|
|  | g/kg | | |
| Ash | 6.23 | 7.11 | 6.76 |
| Moisture | 9.07 | 9.05 | 8.79 |
| Fat | 14.06 | 13.65 | 13.82 |
| Protein | 29.41 | 27.11 | 26.77 |
| Starch | 36.91 | 36.37 | 38.36 |
| Calcium | 1.26 | 1.30 | 1.18 |
| Phosphorus | 1.02 | 1.09 | 1.03 |
|  | kcal/g | | |
| Gross Energy | 4.53 | 4.52 | 4.47 |

Figure 16:
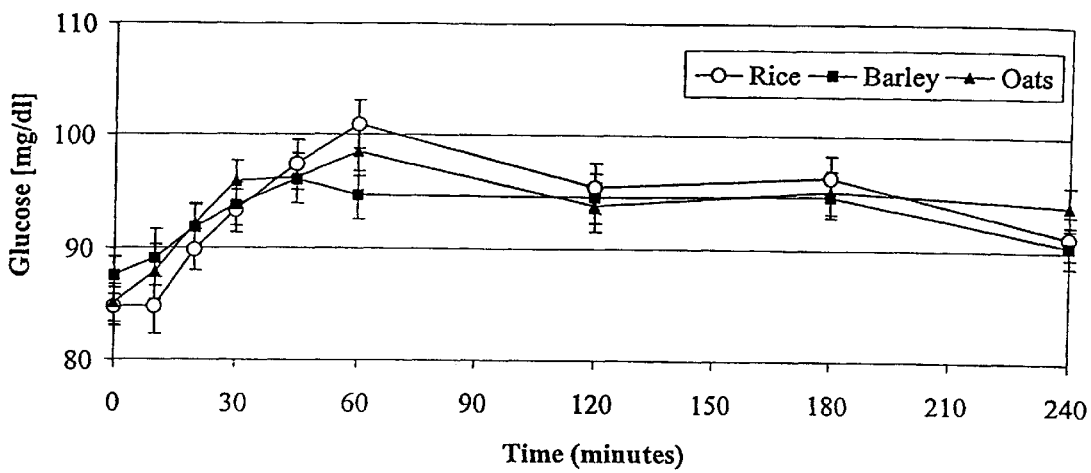
FIG. 16 is a graph illustrating the glucose response curves for dogs consuming diets containing different dietary starches.
Figure 17:
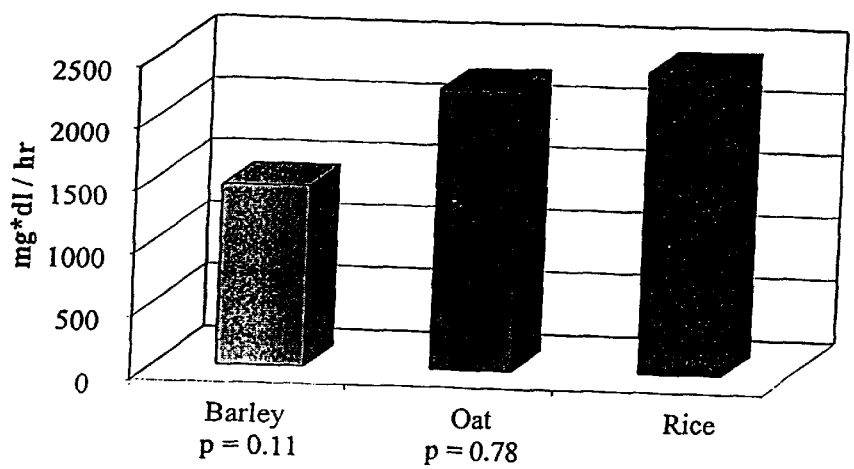
FIG. 17 is a graph of incremental area under the glucose curve for dogs consuming diets containing different dietary starches.
Figure 18:
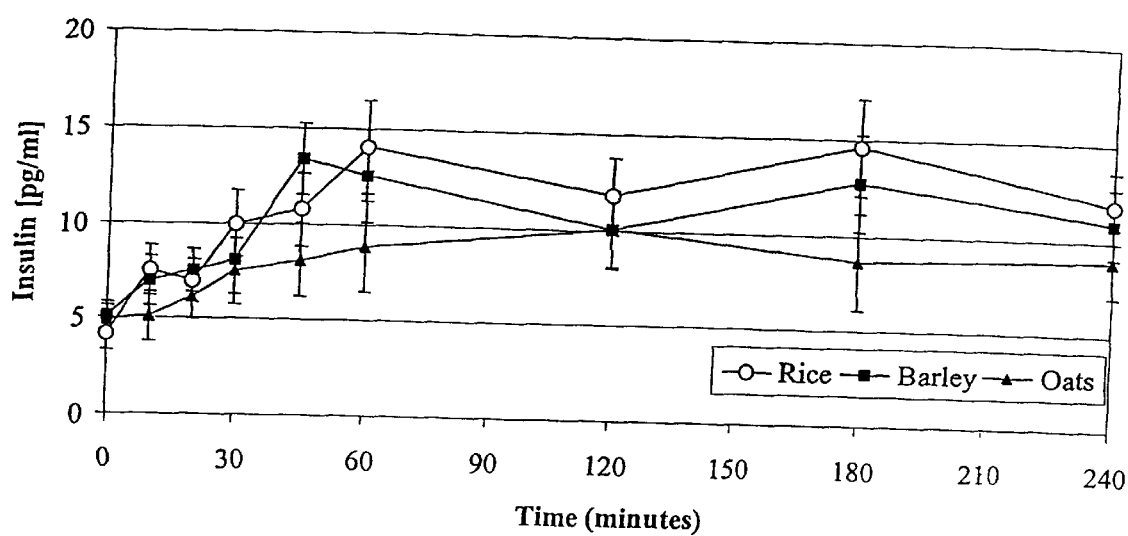
FIG. 18 is a graph illustrating the insulin response curves for dogs consuming diets containing different dietary starches.
Figure 19:
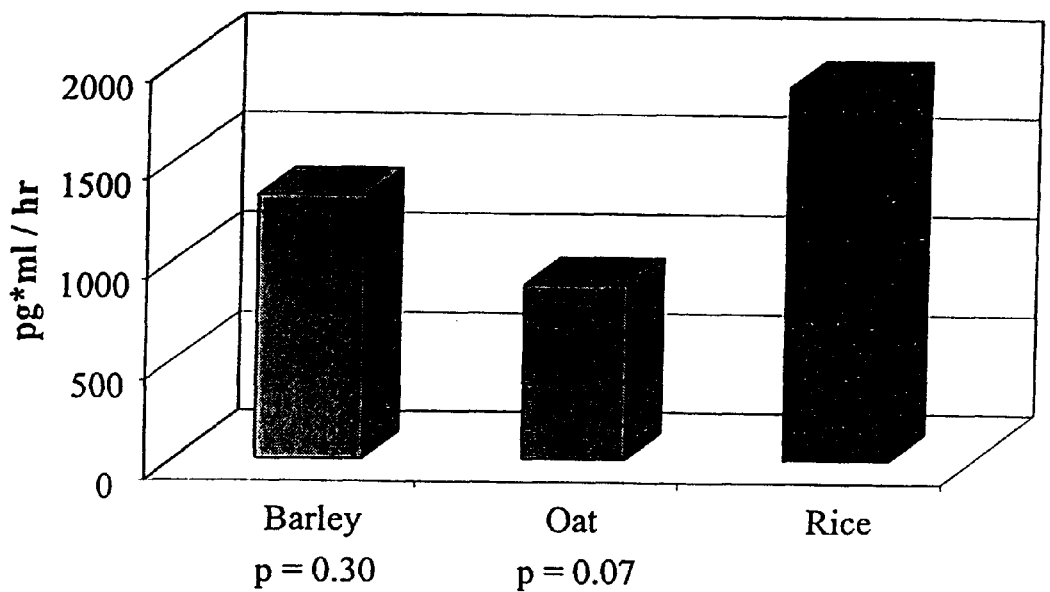
FIG. 19 is a graph of incremental area under the insulin curve for dogs consuming diets containing different dietary starches.

The data were analyzed as follows: Glucose and insulin were measured at nine different time points as shown in FIGS. 16 and 18. Time point "0" was considered as the baseline and consisted of the average of both baseline samples. Area under the curve (FIGS. 17 and 19), area above baseline, time of peak and peak amplitude were calculated for both insulin and glucose. These variables were analyzed using analysis of variance for randomized block design (SAS User's Guide: Statistics, Cary, NC; SAS Institute Inc., 1989). The classification included sources for: Treatment, Replication and Error. All F-Tests used $\alpha=0.10$ and LSD used $\alpha=0.05$.

Time dependent responses were studied using a repeated measure analysis of variance and the per-time glucose or insulin observations. The classification included sources for: Time, Treatment x Time, Replicate within Treatment-Time combinations and Error. Treatment effects were tested using Replicate, Treatment, Replicate x Treatment for the Error term. All F-Tests and LSD used $\alpha=0.05$.

Results: There were no differences between diets for body weight or weekly food consumption quantities (data not shown). There were no differences detected between the individual time points and between the other variables evaluated ($P>0.05$). As shown in FIG. 16, RICE diet resulted in a slightly higher glucose peak and a slightly elevated glucose response compared to the BARLEY and OAT diets. Several dogs did not return to baseline glucose levels by the end of the glycemic response test indicating a reduced ability of geriatric dogs to respond to glucose elevation. The incremental area under the glucose curve (FIG. 17) for those dogs that consumed the RICE diet tended to be higher ($P<0.12$) compared with dogs that consumed the BARLEY diet and was only marginally higher compared to dogs that consumed the OAT diet.

Insulin response data (FIGS. 18 and 19) showed that at the 45 min-time point, OAT diet had a significantly lower ($P<0.05$) insulin level than BARLEY diet but was not different ($P>0.05$) than RICE diet. The insulinemic response for the RICE and BARLEY diets had two distinct insulin peaks at approximately at 45 to 60 min and 180 min with RICE eliciting a higher peak at both time points. OAT diet resulted in a flatter response with a single peak. The insulin response of several dogs did not return to baseline glucose levels by the 240-min time point. This delay may indicate a reduced capacity for older dogs to respond to glucose elevation. In fact, one of the geriatric dogs was removed from the study because it had an extremely high baseline and poorly compensated glucose peak which is compatible with diabetes. The extremely variable glycemic response observed in these geriatric dogs in combination with the large variations between replicates muffled the diet effect and demonstrated that geriatric dogs have an erratic glycemic response. The dogs which consumed the RICE diet tended to have an elevated incremental area under the insulin curve ($P<0.08$) when compared with the OAT diet-fed dogs and had only a marginally higher incremental area under the insulin curve when compared with the BARLEY diet-fed dogs.

The stool scores remained normal for all dogs during the entire study and there were no differences ($P>0.05$) between treatment groups (data not shown).

The RICE diet produced exaggerated glucose and insulin curves in response to a glycemic tolerance test in dogs when compared with the BARLEY and OAT diet-fed dogs. This effect can be quantified over the entire 240-min test as an incremental area under the curve. Although these effects were not significantly different at a 95% confidence interval, these exaggerated responses over time may be the first step to developing insulin resistance and glucose intolerance. Currently, most dog diets in the commercial market contain rice as the starch source. This may be detrimental to the animal in the long term, or to an animal exhibiting signs of impaired glucose tolerance by initiating and maintaining higher glucose and insulin responses to a meal. In this experiment, the OAT diet was most effective at lowering the insulin response to a meal whereas the BARLEY diet was most effective at lowering the glucose response to a meal. A blend of these two starch sources would be beneficial in helping to control the glucose response in dogs that exhibit signs of impaired glucose tolerance or as a preventative measure for feeding long-term by lowering both the glucose and insulin responses to a meal.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A pet food composition for controlling postprandial glycemic and insulinemic response in a companion animal comprising a source of protein, a source of fat, and a source of carbohydrates from a grain source which excludes rice.

2. A pet food composition as claimed in claim 1 in which said source of carbohydrates comprises a blend of corn and sorghum.

3. A pet food composition as claimed in claim 2 in which the ratio of corn to sorghum is from about 1:5 to about 5:1.

4. A pet food composition as claimed in claim 2 in which the ratio of corn to sorghum is from about 1:3 to about 3:1.

5. A pet food composition as claimed in claim 2 in which the ratio of corn to sorghum is about 1:1.

6. A pet food composition as claimed in claim 1 in which said source of carbohydrates comprises a blend of corn, sorghum, and barley.

7. A pet food composition as claimed in claim 6 in which the ratio of corn to sorghum to barley is from about 1:1:5 to about 1:5:1 to about 5:1:1.

8. A pet food composition as claimed in claim 6 in which the ratio of corn to sorghum to barley is from about 1:1:3 to about 1:3:1 to about 3:1:1.

9. A pet food composition as claimed in claim 6 in which the ratio of corn to sorghum to barley is about 1:1:1.

10. A pet food composition as claimed in claim 1 in which said source of carbohydrates comprises a blend of corn, sorghum, and oats.

11. A pet food composition as claimed in claim 10 in which the ratio of corn to sorghum to oats is from about 1:1:5 to about 1:5:1 to about 5:1:1.

12. A pet food composition as claimed in claim 10 in which the ratio of corn to sorghum to oats is from about 1:1:3 to about 1:3:1 to about 3:1:1.

13. A pet food composition as claimed in claim 10 in which the ratio of corn to sorghum to oats is about 1:1:1.

14. A pet food composition as claimed in claim 1 in which said source of carbohydrates comprises a blend of oats and barley.

15. A pet food composition as claimed in claim 14 in which the ratio of oats to barley is from about 1:5 to about 5:1.

16. A pet food composition as claimed in claim 14 in which the ratio of oats to barley is from about 1:3 to about 3:1.

17. A pet food composition as claimed in claim 14 in which the ratio of oats to barley is about 1:1.

18. A pet food composition for controlling postprandial glycemic and insulinemic response in a companion animal comprising from about 20 to about 40% crude protein, from about 4 to about 30% fat, from about 2 to about 20% total dietary fiber, and a source of carbohydrates from a grain source which excludes rice.

19. A pet food composition as claimed in claim 18 in which said source of carbohydrates is selected from the group consisting of a blend of corn and sorghum, a blend of corn, sorghum, and barley, a blend of corn, sorghum, and oats, and a blend of oats and barley.

20. A pet food composition as claimed in claim 19 further including chromium tripicolinate.

21. A pet food composition as claimed in claim 19 further including a water soluble, cellulose ether.

22. A pet food composition as claimed in claim 19 further including from about 1 to about 11 weight percent of supplemental total dietary fiber of fermentable fibers which have an organic matter disappearance of 15 to 60 weight percent when fermented by fecal bacteria for a 24 hour period.

23. A process for controlling postprandial glycemic and insulinemic response in a companion animal comprising the steps of feeding said companion animal a pet food composition comprising a source of protein, a source of fat, and a source of carbohydrates in amounts effective to control postprandial glycemic and insulinemic response, said source of carbohydrates from a grain source which excludes rice.

24. A process as claimed in claim 23 in which said source of carbohydrates comprises a blend of corn and sorghum.

25. A process as claimed in claim 24 in which the ratio of corn to sorghum is from about 1:5 to about 5:1.

26. A process as claimed in claim 24 in which the ratio of corn to sorghum is from about 1:3 to about 3:1.

27. A process as claimed in claim 24 in which the ratio of corn to sorghum is about 1:1.

28. A process as claimed in claim 23 in which said source of carbohydrates comprises a blend of corn, sorghum, and barley.

29. A process as claimed in claim 28 in which the ratio of corn to sorghum to barley is from about 1:1:5 to about 1:5:1 to about 5:1:1.

30. A process as claimed in claim 28 in which the ratio of corn to sorghum barely is from about 1:1:3 to about 1:3:1 to about 3:1:1.

31. A process as claimed in claim 28 in which the ratio of corn to sorghum to barley is about 1:1:1.

32. A process as claimed in claim 23 in which said source of carbohydrates comprises a blend of corn, sorghum, and oats.

33. A process as claimed in claim 32 in which the ratio of corn to sorghum to oats is from about 1:1:5 to about 1:5:1 to about 5:1:1.

34. A process as claimed in claim 32 in which the ratio of corn to sorghum to oats is from about 1:1:3 to about 1:3:1 to about 3:1:1.

35. A process as claimed in claim 32 in which the ratio of corn to sorghum to oats is about 1:1:1.

36. A process as claimed in claim 23 in which said source of carbohydrates comprises a blend of oats and barley.

37. A process as claimed in claim 36 in which the ratio of oats to barley is from about 1:5 to about 5:1.

38. A process as claimed in claim 36 in which the ratio of oats to barley is from about 1:3 to about 3:1.

39. A process as claimed in claim 36 in which the ratio of oats to barley is about 1:1.

40. A process as claimed in claim 23 in which said companion animal is a geriatric dog.

41. A process as claimed in claim 24 in which said companion animal is a geriatric dog.

42. A process for controlling postprandial glycemic and insulinemic response in a companion animal comprising the steps of feeding said companion animal a pet food compositions comprising from about 20 to about 40% crude protein, from about 4 to about 30% fat, from about 2 to about 20% total dietary fiber, and a source of carbohydrates in amounts effective to control postprandial glycemic and insulinemic response, said souce of carbohydrates from a grain source which excludes rice.

43. A process as claimed in claim 42 in which said source of carbohydrates is selected from the group consisting of a blend of corn and sorghum, a blend of corn, sorghum, and barley, a blend of corn, sorghum, and oats, and a blend of oats and barley.

44. A process as claimed in claim 43 further including chromium tripicolinate.

45. A process as claimed in claim 43 further including a water soluble, cellulose ether.

46. A process as claimed in claim 43 further including from about 1 to about 11 weight percent of supplemental total dietary fiber of fermentable fibers which have an organic matter disappearance of 15 to 60 weight percent when fermented by fecal bacteria for a 24 hour period.

47. A process as claimed in claim 42 in which said companion animal is a geriatric dog.

48. A process as claimed in claim 43 in which said companion animal is a geriatric dog.

49. A process as claimed in claim 42 in which said companion animal is a large breed dog.

50. A process as claimed in claim 49 in which said large breed dog is a Labrador retriever.

51. A process for controlling hyperinsulinemia in a large breed dog comprising the steps of feeding said large breed dog a pet food compositions comprising from about 20 to about 40% crude protein, from about 4 to about 30% fat, from about 2 to about 20% total dietary fiber, and a source of carbohydrates in amounts effective to control hyperinsulinemia, said source of carbohydrates from a grain source which excludes rice.

52. A process as claimed in claim 51 in which said source of carbohydrates is selected from the group consisting of a blend of corn and sorghum, a blend of corn, sorghum, and barley, a blend of corn, sorghum, and oats, and a blend of oats and barley.

53. A process as claimed in claim 51 in which said large breed dog is a Labrador retriever.

* * * * *

UNITED STATES PATENT AND TRADEMARK OFFICE
CERTIFICATE OF CORRECTION

PATENT NO. : 6,238,708 B1
DATED : May 29, 2001
INVENTOR(S) : Michael Griffin Hayek et al.

Page 1 of 1

It is certified that error appears in the above-identified patent and that said Letters Patent is hereby corrected as shown below:

<u>Column 22,</u>
Line 12, "corn to sorghum barely" should be -- corn to sorghum to barley --.
Line 42, "compositions" should be -- composition --.

Signed and Sealed this

Fifteenth Day of January, 2002

Attest:

JAMES E. ROGAN
*Director of the United States Patent and Trademark Office*

*Attesting Officer*